US012700923B2

(12) United States Patent (10) Patent No.: US 12,700,923 B2

Sasai et al. (45) Date of Patent: Aug. 4, 2026

(54) OPTICAL TRANSMISSION CHARACTERISTIC ESTIMATION APPARATUS, OPTICAL TRANSMISSION CHARACTERISTIC ESTIMATION METHOD AND PROGRAM

(71) Applicant: NTT, Inc., Tokyo (JP)

(72) Inventors: Takeo Sasai, Musashino (JP); Etsushi Yamazaki, Musashino (JP); Masanori Nakamura, Musashino (JP)

(73) Assignee: NTT, Inc., Tokyo (JP)

( * ) Notice: Subject to any disclaimer, the term of this patent is extended or adjusted under 35 U.S.C. 154(b) by 230 days.

(21) Appl. No.: 18/727,661

(22) PCT Filed: Jan. 21, 2022

(86) PCT No.: PCT/JP2022/002185

§ 371 (c)(1),
(2) Date: Jul. 9, 2024

(87) PCT Pub. No.: WO2023/139749

PCT Pub. Date: Jul. 27, 2023

(65) Prior Publication Data

US 2025/0105917 A1      Mar. 27, 2025

(51) Int. Cl.
H04B 10/00 (2013.01)
H04B 10/073 (2013.01)
(Continued)

(52) U.S. Cl.
CPC ....... H04B 10/073 (2013.01); H04B 10/2543 (2013.01); H04B 10/6163 (2013.01)

(58) Field of Classification Search
CPC .... H04B 10/07; H04B 10/075; H04B 10/077; H04B 10/0775; H04B 10/079; H04B 10/0795; H04B 10/07951; H04B 10/07955
See application file for complete search history.

(56) References Cited

U.S. PATENT DOCUMENTS 6,023,366 A     2/2000  Kinoshita
2002/0039226 A1     4/2002  Murakami et al.
(Continued)

FOREIGN PATENT DOCUMENTS

JP      H05-292033 A     11/1993
JP      H09-321701 A     12/1997
(Continued)

OTHER PUBLICATIONS

Sasai et al., "Digital Longitudinal Monitoring of Optical Fiber Communication Link", Journal of Lightwave Technology, Dec. 29, 2021 (Year: 2021).*

(Continued)

*Primary Examiner* — Daniel G Dobson
(74) *Attorney, Agent, or Firm* — Harness, Dickey & Pierce, PLC

(57)      ABSTRACT

Provided an optical transmission characteristic estimation device that models an optical effect of an optical transmission line by a nonlinear Schrodinger equation, divides the optical transmission line into N (N is an integer of two or more) sections, obtains a solution of the nonlinear Schrodinger equation by an operation of N steps in which a section length of each of the divided N sections is a step size, and estimates transmission characteristics of the optical transmission line, the optical transmission characteristic estimation device including a step size update unit configured to update each of the N step sizes on the basis of an estimated optical power distribution and an estimated dispersion distribution, which are indicated by the transmission characteristics.

8 Claims, 14 Drawing Sheets

(51) Int. Cl.
H04B 10/2543        (2013.01)
H04B 10/61          (2013.01)
*H04J 14/00*           (2006.01)

(56)                    References Cited

U.S. PATENT DOCUMENTS

| | | | |
|---|---|---|---|
| 2010/0239254 A1* | 9/2010 | Li | H04B 10/2507 |
| | | | 398/65 |
| 2012/0121259 A1 | 5/2012 | Kuwata et al. | |
| 2013/0156443 A1* | 6/2013 | Lowery | H04B 10/6163 |
| | | | 398/141 |
| 2019/0074903 A1 | 3/2019 | Takamuku et al. | |
| 2022/0007093 A1* | 1/2022 | MacKay | H04B 10/038 |
| 2022/0416890 A1 | 12/2022 | Sasai et al. | |
| 2023/0106338 A1 | 4/2023 | Sasai et al. | |

FOREIGN PATENT DOCUMENTS

| | | |
|---|---|---|
| JP | 2014-195149 A | 10/2014 |
| WO | WO-2017/217217 A1 | 12/2017 |
| WO | WO-2021/124415 A1 | 6/2021 |
| WO | WO-2021/199317 A1 | 10/2021 |

OTHER PUBLICATIONS

T. Sasai et al., "Simultaneous Detection of Anomaly Points and Fiber types in Multi-span Transmission Links Only by Receiver-side Digital Signal Processing", OFC2020, Paper Th1F.1, 2020.

T. Sasai et al., "Physics-oriented learning of nonlinear Schrodinger equation: optical fiber loss and dispersion profile identification", arXiv:2104.05890, 2021.

T. Sasai et al., "Digital Backpropagation for Optical Path Monitoring: Loss Profile and Passband Narrowing Estimation", ECOC2020, Paper Tu2D.1, 2020.

T. Sasai et al., "Revealing Raman-amplified Power Profile and Raman Gain Spectra with Digital Backpropagation", in OFC2021, Paper M31.5, 2021.

M. K. Barnoski et al., "Fiber waveguides: a novel technique for investigating attenuation characteristics", Applied Optics, 15(9), pp. 2112-2115, 1976.

S. Furukawa et al., "Enhanced Coherent OTDR for Long Span Optical Transmission Lines Containing Optical Fiber Amplifiers", IEEE Photon. Technol. Lett., 7(5), pp. 540-542, 1995.

A. Matsushita et al., "High-Spectral-Efficiency 600-Gbps/Carrier Transmission Using PDM-256QAM Format", Journal of Lightwave Technology, 37(2), 2019.

T. Tanimura et al., "Experimental Demonstration of a Coherent Receiver that Visualizes Longitudinal Signal Power Profile over Multiple Spans out of Its Incoming Signal", ECOC2019 PD.3.4, 2019.

T. Tanimura et al., "Fiber-Longitudinal Anomaly Position Identification Over Multi-Span Transmission Link Out of Receiver-end Signals", J. Lightw. Technol., 38(9), 2020.

Takeo Sasai et al., "Digital Longitudinal Monitoring of Optical Fiber Communication Link", Journal of Lightwave Technology, Dec. 29, 2021.

Dietrich Marcuse et al., "Application of the Manakov-PMD Equation to Studies of Signal Propagation in Optical Fibers with Randomly Varying Birefringence", Journal of Lightwave Technology, Sep. 1997, vol. 15, No. 9, pp. 1735-1746.

Multispan optical transmission line monitoring technology by learning nonlinear Schrödinger equation, Business Communication, 2021, vol. 58, No. 6, pp. 22-25.

Takeo Sasai et al., "Digital Backpropagation for Optical Path Monitoring -Loss and Dispersion Profile Estimation-", IEICE Technical Report, Jan. 7, 2021, OCS2020-39, pp. 61-64.

International Search Report of the International Searching Authority, issued in PCT/JP2022/002185, mailed Apr. 12, 2022; ISA/JP.

IP E et al: "Compensation of Dispersion and Nonlinear Impairment Using Digital Backpropagation", Journal of Lightwave Technology, IEEE, USA, vol. 26, No. 20, Oct. 15, 2008 (Oct. 15, 2008), pp. 3416-3425, XP011241197, ISSN: 0733-8724, DOI: 10.1109/JLT.2008.927791.

Asif Rameez et al: "Optimized digital backward propagation for phase modulated signals in mixed-optical fiber transmission links", Optics Express,, vol. 18, No. 22, Oct. 25, 2010 (Oct. 25, 2010), p. 22796, XP002715061, DOI: 10.1364/OE.18.022796 [retrieved on Oct. 13, 2010].

* cited by examiner

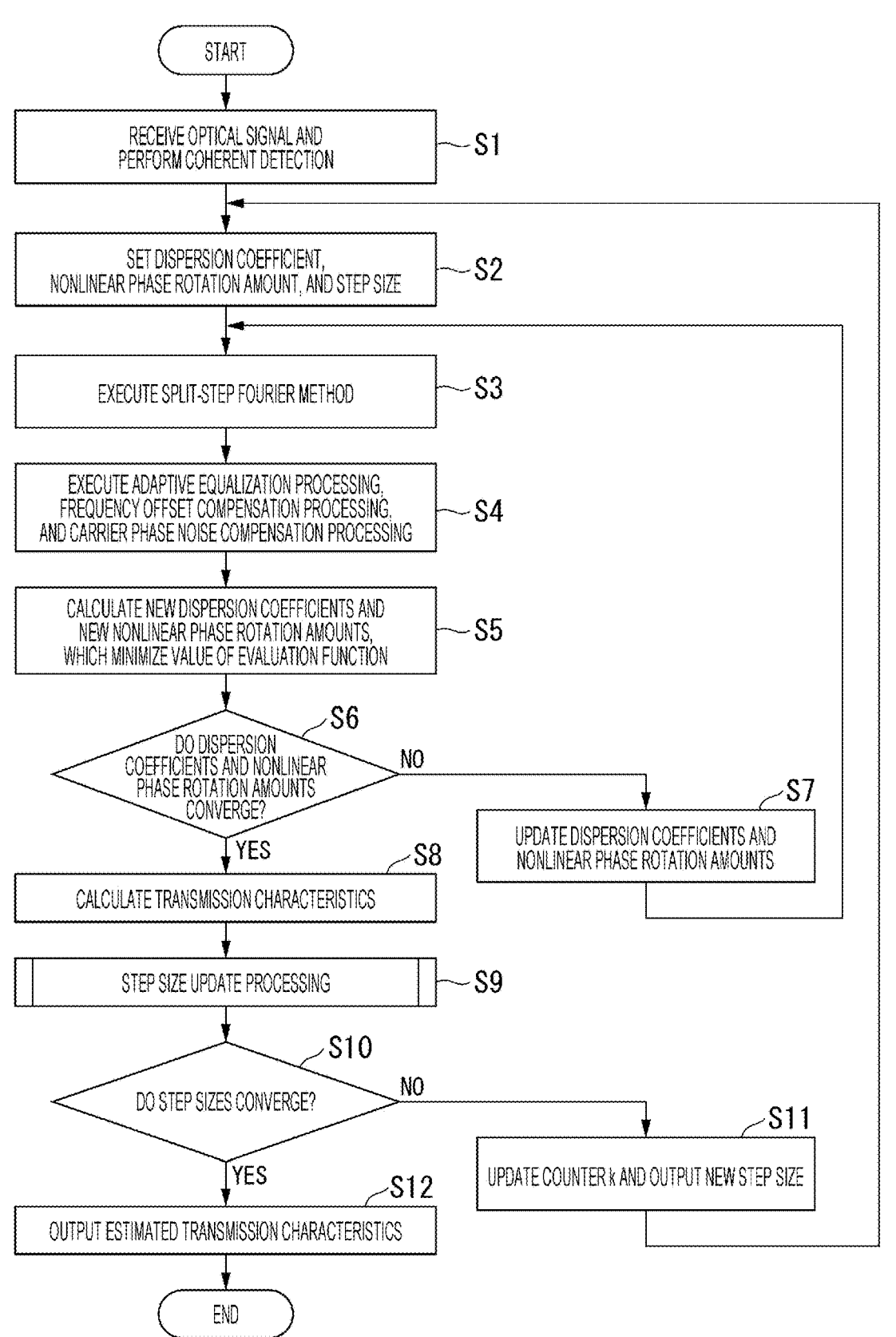

START

RECEIVE OPTICAL SIGNAL AND
PERFORM COHERENT DETECTION — S1

SET DISPERSION COEFFICIENT,
NONLINEAR PHASE ROTATION AMOUNT, AND STEP SIZE — S2

EXECUTE SPLIT-STEP FOURIER METHOD — S3

EXECUTE ADAPTIVE EQUALIZATION PROCESSING,
FREQUENCY OFFSET COMPENSATION PROCESSING,
AND CARRIER PHASE NOISE COMPENSATION PROCESSING — S4

CALCULATE NEW DISPERSION COEFFICIENTS AND
NEW NONLINEAR PHASE ROTATION AMOUNTS,
WHICH MINIMIZE VALUE OF EVALUATION FUNCTION — S5

DO DISPERSION
COEFFICIENTS AND NONLINEAR
PHASE ROTATION AMOUNTS
CONVERGE? — S6

NO

UPDATE DISPERSION COEFFICIENTS AND
NONLINEAR PHASE ROTATION AMOUNTS — S7

YES

CALCULATE TRANSMISSION CHARACTERISTICS — S8

STEP SIZE UPDATE PROCESSING — S9

DO STEP SIZES CONVERGE? — S10

NO

UPDATE COUNTER k AND OUTPUT NEW STEP SIZE — S11

YES

OUTPUT ESTIMATED TRANSMISSION CHARACTERISTICS — S12

END

FIG. 6

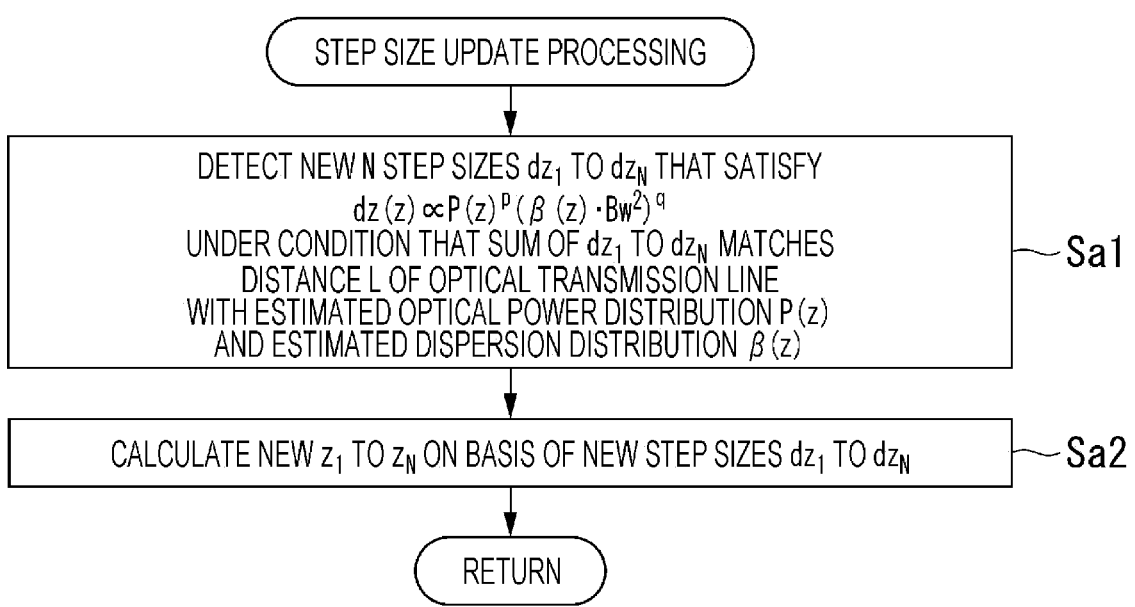

STEP SIZE UPDATE PROCESSING

DETECT NEW N STEP SIZES $dz_1$ TO $dz_N$ THAT SATISFY
$dz(z) \propto P(z)^p (\beta(z) \cdot Bw^2)^q$
UNDER CONDITION THAT SUM OF $dz_1$ TO $dz_N$ MATCHES
DISTANCE L OF OPTICAL TRANSMISSION LINE
WITH ESTIMATED OPTICAL POWER DISTRIBUTION $P(z)$
AND ESTIMATED DISPERSION DISTRIBUTION $\beta(z)$ Sa1

CALCULATE NEW $z_1$ TO $z_N$ ON BASIS OF NEW STEP SIZES $dz_1$ TO $dz_N$

Sa2

RETURN

OPTICAL TRANSMISSION CHARACTERISTIC ESTIMATION APPARATUS, OPTICAL TRANSMISSION CHARACTERISTIC ESTIMATION METHOD AND PROGRAM

CROSS-REFERENCE TO RELATED APPLICATIONS

This application is a 371 U.S. National Phase of International Application No. PCT/JP2022/002185, filed on Jan. 21, 2022. The entire disclosure of the above application is incorporated herein by reference.

TECHNICAL FIELD

The present invention relates to an optical transmission characteristic estimation device, an optical transmission characteristic estimation method, and a program.

BACKGROUND ART

When an optical transmission system is operated, basic characteristics of an optical fiber constituting an optical transmission line greatly affect transmission performance. Here, the basic characteristics of the optical fiber include optical power, the distribution of loss and dispersion, and the position of a fault point. For example, when the optical power is too large, the influence of a nonlinear optical effect in the optical fiber increases. Therefore, a signal-to-noise ratio (hereinafter referred to as "SNR") decreases. When the loss is too large, the attenuation of the optical power increases accordingly, and the SNR decreases.

Therefore, it is important to know the characteristics of the optical fiber in operation, maintenance, and monitoring of the optical transmission system. The optical transmission line includes various devices other than the optical fiber, for example, an optical amplifier, an optical filter, and the like, and it is also important to know characteristics of these devices in operation, maintenance, and monitoring of the optical transmission system.

The characteristics of the device such as the optical fiber, the optical amplifier, or the optical filter can be generally measured by an analog measuring instrument such as an optical time domain reflectometer (OTDR) or an optical spectrum analyzer. However, in measurement using the analog measuring instrument, there is a problem that it needs to perform direct measurement on each optical node or each optical fiber, which increases equipment cost and operation cost.

In order to solve this problem, in recent years, digital longitudinal monitoring (DLM), which is a technology for detecting characteristics of various devices in an optical transmission system by digital signal processing on a reception side of the optical transmission system, has been proposed instead of the measurement by the analog measuring instrument (For example, refer to Patent Literatures 1 and 2 and Non Patent Literatures 1 to 4). The DLM is based on a digital coherent optical transmission system, and in the DLM, digital signal processing is performed on a reception signal obtained by coherent detecting an optical signal transmitted through the optical transmission line, and thus the optical power or the like, which is a characteristic of an optical transmission line, is monitored.

2

CITATION LIST

Patent Literature

Patent Literature 1: WO 2021/124415 A
Patent Literature 2: WO 2021/199317 A

Non Patent Literature

Non Patent Literature 1: T. Sasai, et al., "Simultaneous detection of anomaly points and fiber types in multi-span transmission links only by receiver-side digital signal processing", IEEE, 2020 Optical Fiber Communications Conference and Exhibition (OFC), Paper Th1F.1, March 2020.
Non Patent Literature 2: T. Sasai, et al., "Physics-oriented learning of nonlinear Schrodinger equation: optical fiber loss and dispersion profile identification", arXiv: 2104.05890, April 2021.
Non Patent Literature 3: T. Sasai, et al., "Digital backpropagation for optical path monitoring: loss profile and passband narrowing estimation", IEEE, 2020 European Conference on Optical Communications (ECOC), Paper Tu2D.1, December 2020.
Non Patent Literature 4: T. Sasai, et al., "Revealing Raman-amplified power profile and Raman gain spectra with digital backpropagation", IEEE, 2021 Optical Fiber Communications Conference and Exhibition (OFC), Paper M31.5, June 2021.

SUMMARY OF INVENTION

Technical Problem

In the DLM, as compared to the analog measuring instrument, direct measurement does not need to be performed at the site, and thus the measurement can be easily performed. However, the DLM has a problem that the estimation accuracy for the device characteristics is inferior to that of the analog measuring instrument. More specifically, in a case where the propagation direction distribution of the optical power of the optical signal transmitted through the optical transmission line is estimated using the DLM, when there is a discontinuous power fluctuation (for example, concentrated amplification by an optical amplifier, abnormal loss of an optical fiber, and the like) in the optical transmission line, there is a phenomenon in which the accuracy of estimating the optical power distribution in the vicinity of the discontinuous point is lower than the accuracy of the analog measuring instrument.

For example, it is assumed that measurement by the OTDR and measurement by the DLM are performed on an optical transmission line 200 including a plurality of optical fibers 201-1 to 201-5 and a plurality of optical amplifiers 202-1, 202-2, 202-3, and 202-4 inserted between a plurality of the optical fibers 201-1 to 201-5, which are illustrated in FIG. 16(*a*). FIG. 16(*b*) is a graph showing measurement results of the measurement by the OTDR and the measurement by the DLM. A vertical axis indicates the magnitude of the optical power, and a horizontal axis represents a distance represented in units of [km]. In the graph of FIG. 16(*b*), a broken line indicates the measurement result by the OTDR, and a solid line indicates the measurement result by the DLM. Note that the length of each of the optical fibers 201-2 to 201-5 is 70 km, and the position of 0 km in the graph of FIG. 16(*b*) is a connection point between the optical fiber 201-1 and the optical amplifier 202-1 in FIG. 16($a$), that is, the position of the optical fiber input in the optical amplifier 202-1.

As can be seen from the graph of FIG. 16($b$), the measurement result by the DLM has accuracy less than that of the measurement result by the OTDR in a section near 70 km indicated by a reference numeral 301, a section near 140 km indicated by a reference numeral 302, and a section near 210 km indicated by a reference numeral 303. What is common to the sections indicated by reference numerals 301, 302, and 303 is the vicinity of the start and end of the optical transmission span near the optical amplifiers 202-2 to 202-4. Accordingly, in the DLM, there are measurement dead zones in which the estimation accuracy decreases at the start and end of the optical transmission span in the vicinity of the optical amplifiers 202-2 to 202-4. In order to improve the estimation accuracy of the optical power distribution in the vicinity of the optical amplifiers 202-2 to 202-4, it is conceivable to use an optical signal of the optical power larger than that in normal operation for measurement. However, there is a circumstance that it is desired to avoid increasing the optical power since the quality of the optical signal is deteriorated due to the nonlinear optical effect and the communication quality is deteriorated.

In the view of the above-described circumstances, an object of the present invention is to provide a technology of making it possible to obtain an estimation result with appropriate accuracy in the measurement dead zone even when the optical signal of low output optical power used in the normal operation is used in a case where characteristics of the optical transmission line are estimated by the DLM.

Solution to Problem

According to an aspect of the present invention, there is provided an optical transmission characteristic estimation device that models an optical effect of an optical transmission line by a nonlinear Schrodinger equation, divides the optical transmission line into N (N is an integer of two or more) sections, obtains a solution of the nonlinear Schrodinger equation by an operation of N steps in which a section length of each of the divided N sections is a step size, and estimates transmission characteristics of the optical transmission line, the optical transmission characteristic estimation device including a step size update unit configured to update each of the N step sizes on the basis of an estimated optical power distribution and an estimated dispersion distribution, which are indicated by the transmission characteristics.

According to another aspect of the present invention, there is provided an optical transmission characteristic estimation method for modeling an optical effect of an optical transmission line by a nonlinear Schrodinger equation, dividing the optical transmission line into N (N is an integer of two or more) sections, obtaining a solution of the nonlinear Schrodinger equation by an operation of N steps in which a section length of each of the divided N sections is a step size, and estimating transmission characteristics of the optical transmission line, the optical transmission characteristic estimation method including updating each of the N step sizes on the basis of an estimated optical power distribution and an estimated dispersion distribution, which are indicated by the transmission characteristics.

According to still another aspect of the present invention, there is provided a program for causing a computer to execute: a procedure of modeling an optical effect of an optical transmission line by a nonlinear Schrodinger equation, and dividing the optical transmission line into N (N is an integer of two or more) sections; a procedure of obtaining a solution of the nonlinear Schrodinger equation by an operation of N steps in which a section length of each of the divided N sections is a step size, and estimating transmission characteristics of the optical transmission line; and a procedure of updating each of the N step sizes on the basis of an estimated optical power distribution and an estimated dispersion distribution, which are indicated by the transmission characteristics.

Advantageous Effects of Invention

According to the aspects of the present invention, it is possible to obtain an estimation result with appropriate accuracy in the measurement dead zone even when the optical signal of low output optical power used in the normal operation is used in a case where characteristics of the optical transmission line are estimated by the DLM.

BRIEF DESCRIPTION OF DRAWINGS

FIG. 6 is a flowchart illustrating a flow of processing of an optical reception device according to the first embodiment.

FIG. 7 is a flowchart illustrating a flow of processing of a step size update unit according to the first embodiment.

DESCRIPTION OF EMBODIMENTS

First Embodiment

Figure 1:
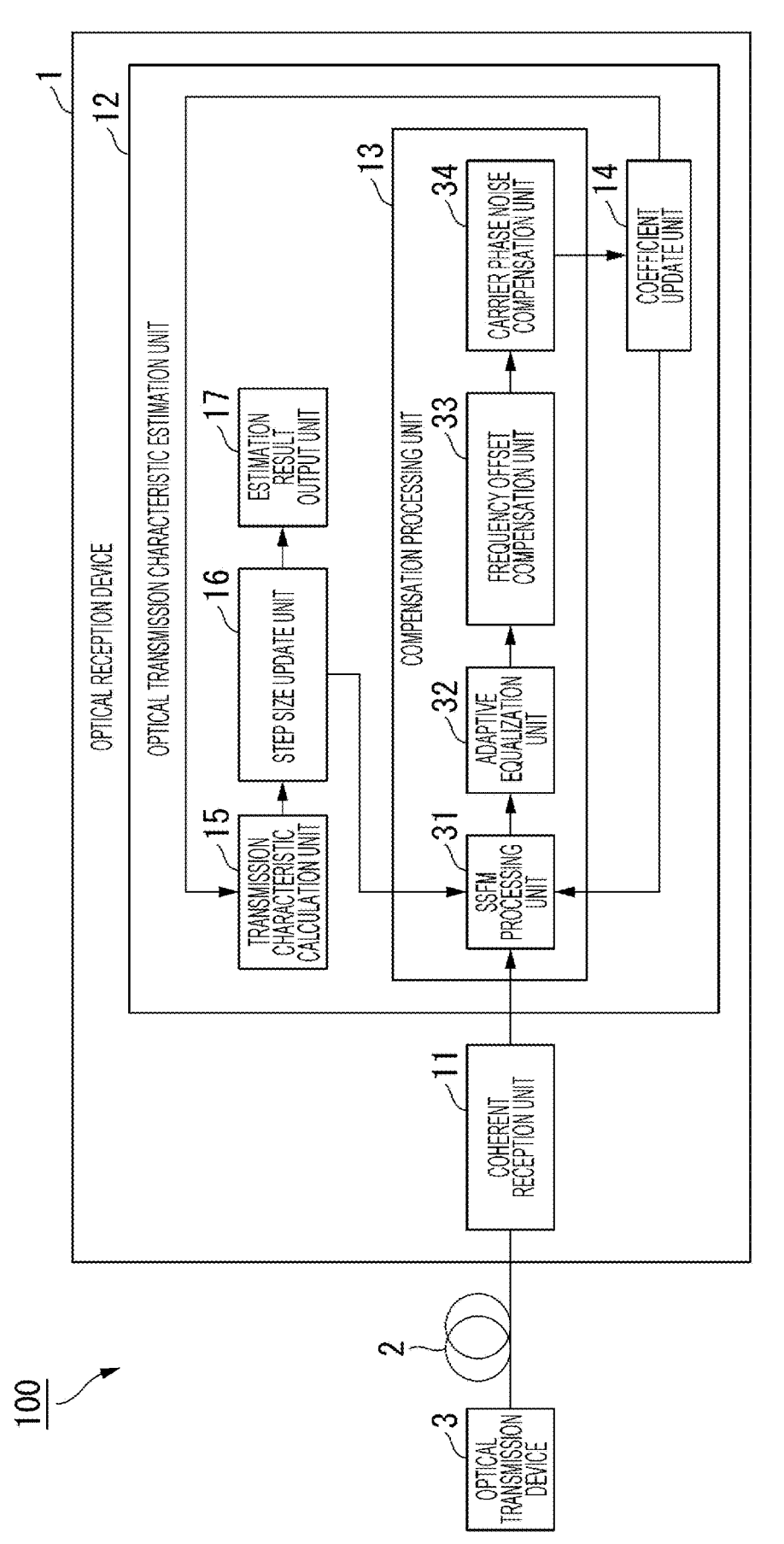
FIG. 1 is a block diagram illustrating a configuration of an optical transmission system according to a first embodiment.

Hereinafter, an embodiment of the present invention will be described with reference to the drawings. FIG. 1 is a block diagram illustrating a configuration of an optical transmission system 100 according to a first embodiment. The optical transmission system 100 is, for example, a digital coherent optical transmission system, and includes an optical transmission device 3, an optical reception device 1, and an optical transmission line 2 that connects the optical transmission device 3 and the optical reception device 1.

For example, the optical transmission device 3 converts a transmission signal of a digital signal constituted by a sequence of 0 and 1 into a format expressed by four components of an in-phase component (hereinafter, referred to as an I component) and a quadrature component (hereinafter, referred to as a Q component) for each of X-polarization and Y-polarization. Hereinafter, the transmission signals represented by these four components are also referred to as a transmission symbol. The optical transmission device 3 applies electric signals respectively having four components obtained by the conversion to four Mach-Zehnder optical modulators, respectively, and modulates each of four light beams obtained by branching laser light emitted from a signal light source provided inside to generate an optical signal. The optical transmission device 3 polarization-synthesizes an X-polarization optical signal and a Y-polarization optical signal by using the optical signals having the I component and Q component for X-polarization obtained by the modulation as an X-polarization optical signal and the optical signals having the I component and Q component for Y-polarization as a Y-polarization optical signal. The optical transmission device 3 transmits a polarization-multiplexed quadrature phase shift keying (QPSK) optical signal generated by polarization synthesis to the optical transmission line 2.

The optical transmission line 2 includes an optical fiber and an optical amplifier, and transmits the polarization-multiplexed QPSK optical signal transmitted from the optical transmission device 3 to the optical reception device 1.

The optical reception device 1 includes a coherent reception unit 11 and an optical transmission characteristic estimation unit 12. The coherent reception unit 11 is connected to the optical transmission line 2, receives the optical signal transmitted through the optical transmission line 2, and performs coherent detection. For example, in a case where the optical transmission device 3 transmits the polarization-multiplexed QPSK optical signal as described above, the coherent reception unit 11 polarization-separates the received optical signal into X-polarization and Y-polarization. The coherent reception unit 11 detects the I component and Q component of each of the X-polarization and the Y-polarization by causing each of the X-polarization optical signal and the Y-polarization optical signal after the polarization separation to interfere with laser light emitted from a local oscillation light source provided inside. The coherent reception unit 11 converts the optical signals having the I component and the Q component of each of the X-polarization and the Y-polarization into four types of analog electric signals, converts the converted four types of analog signals into four types of digital signals by four analog-to-digital converters provided inside, and outputs the four types of digital signals. Hereinafter, the four types of digital signals output from the coherent reception unit 11 are referred to as a reception signal.

The optical transmission characteristic estimation unit 12 includes a compensation processing unit 13, a coefficient update unit 14, a transmission characteristic calculation unit 15, a step size update unit (step size updater) 16, and an estimation result output unit 17. The compensation processing unit 13 performs, on the reception signal output from the coherent reception unit 11, compensation for removing various influences applied to the optical signal during propagation through the optical transmission line 2, and restores a transmission symbol from the reception signal. The compensation processing unit 13 includes an SSFM processing unit (split-step Fourier method processor) 31, an adaptive equalization unit 32, a frequency offset compensation unit 33, and a carrier phase noise compensation unit 34. The SSFM processing unit 31 applies a split-step Fourier method (SSFM), which is one of numerical analysis methods for obtaining a solution of a nonlinear Schrodinger equation, to the reception signal.

(Procedure of Estimating Transmission Characteristics by DLM)

Figure 2:
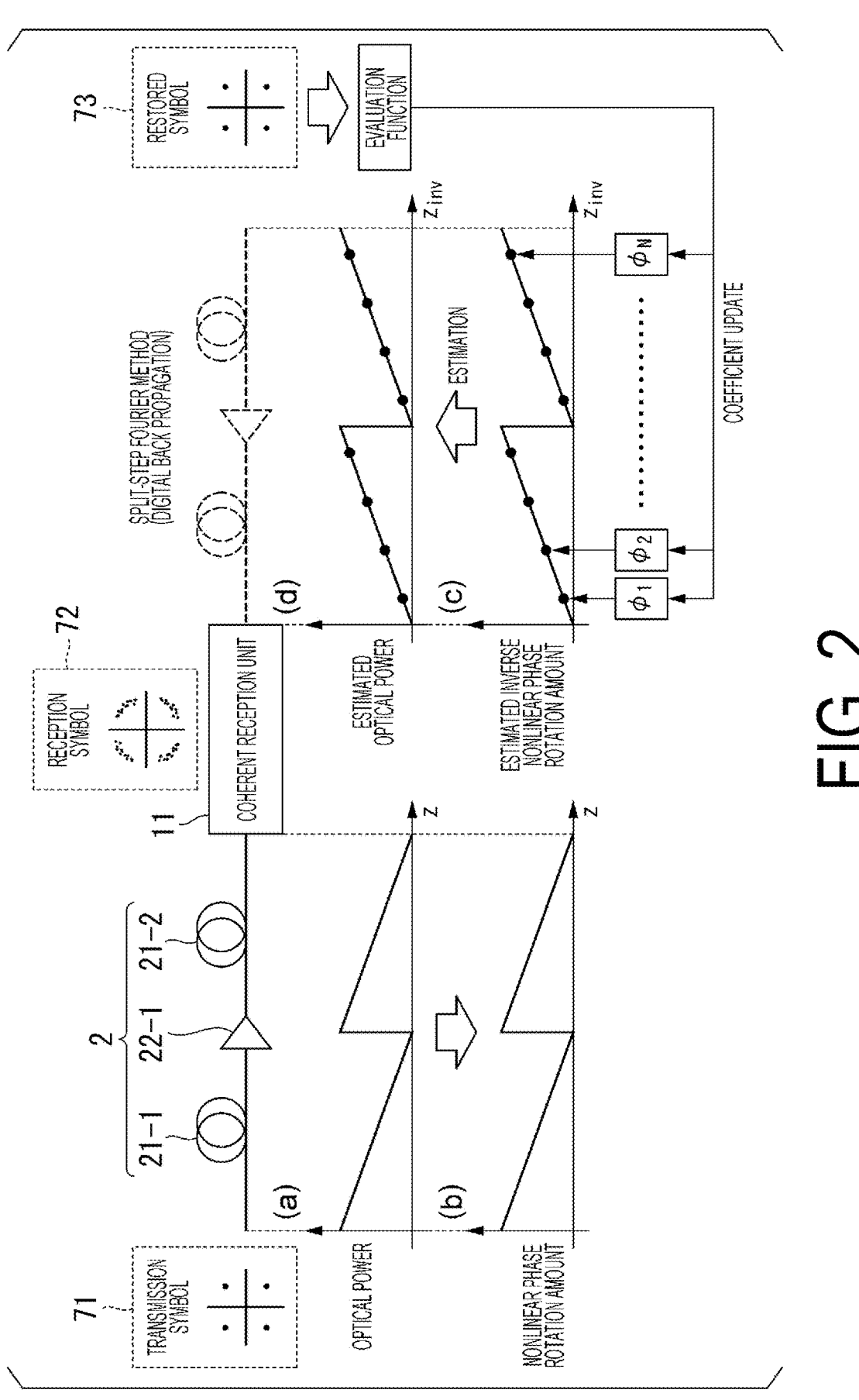
FIG. 2 is a diagram illustrating a procedure of estimating optical power according to the first embodiment.
Figure 3:
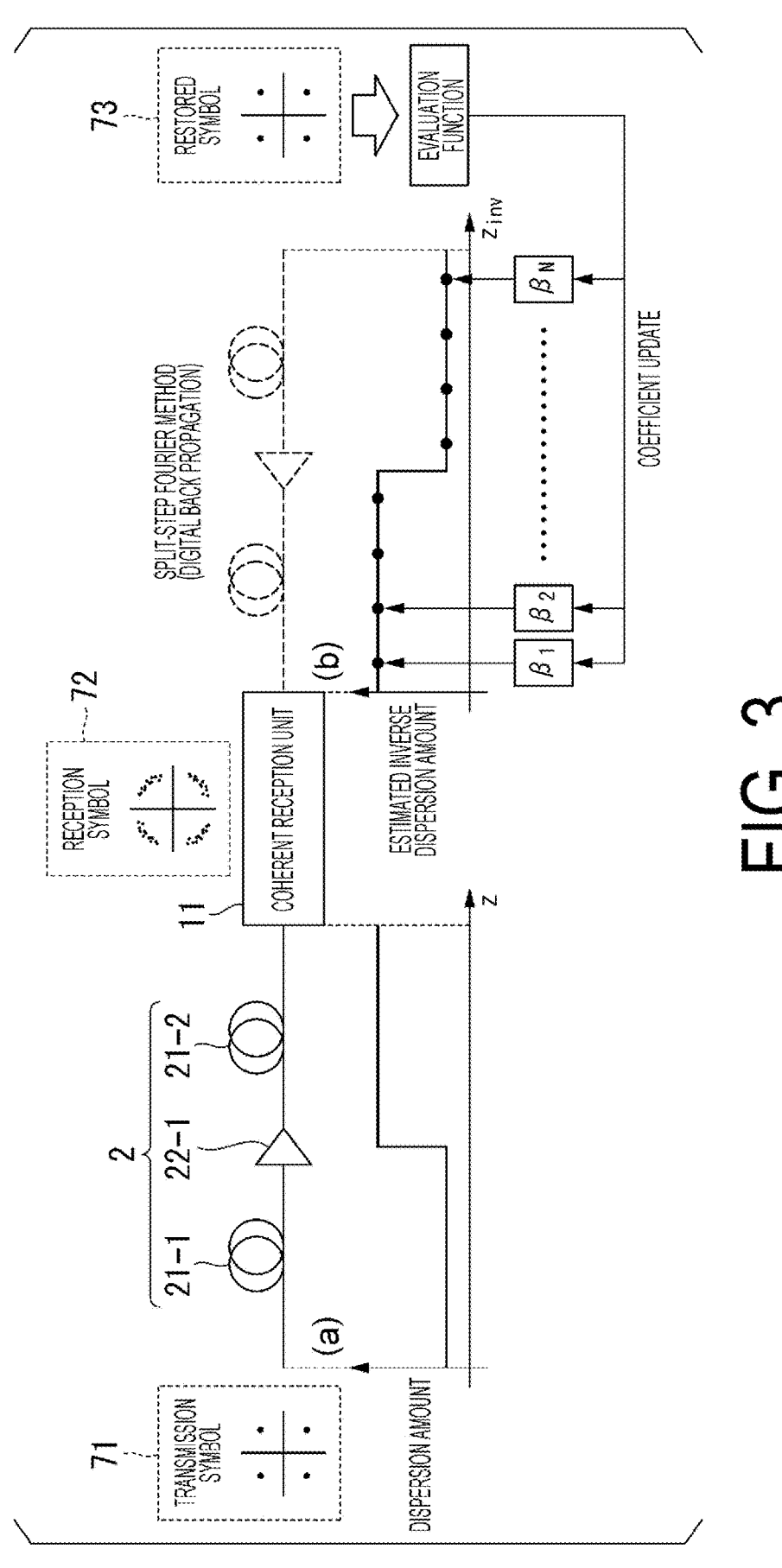
FIG. 3 is a diagram illustrating a procedure of estimating a dispersion coefficient according to the first embodiment.

Here, a procedure of estimating the characteristics of the optical transmission line 2 by the DLM will be described with reference to FIG. 2 and FIG. 3. For example, as illustrated in FIG. 2 and FIG. 3, it is assumed that the optical transmission line 2 includes optical fibers 21-1 and 21-2 and an optical amplifier 22-1 inserted between the optical fibers 21-1 and 21-2. When the optical signal of a transmission symbol 71 propagates through the optical transmission line 2, two optical effects are generated. Note that the transmission symbols 71 illustrated in FIG. 2 and FIG. 3 indicate an example of a constellation of either the X-polarization or the Y-polarization of the polarization-multiplexed QPSK optical signal, and indicate four code points of QPSK. The actual transmission symbol includes two symbols represented by a constellation such as the transmission symbol 71, one of the two symbols corresponds to the X-polarization and the other one corresponds to the Y-polarization.

One of two optical effects is a nonlinear optical effect in which the phase of the optical signal rotates in proportion to the magnitude of the optical power of the optical signal as illustrated in the graphs of FIGS. 2(*a*) and 2(*b*). The horizontal axes of the graphs of FIGS. 2(*a*) and 2(*b*) indicate a distance in the optical transmission line 2, and the origin of the horizontal axis is a connection point between the optical transmission device 3 and the optical transmission line 2, which is illustrated in FIG. 1, that is, the start point of the optical transmission line 2. Note that the end point of the optical transmission line 2 is a connection point between the coherent reception unit 11 and the optical transmission line 2. The vertical axis of the graph of FIG. 2(*a*) indicates the magnitude of the optical power of the optical signal propagating through the optical transmission line 2. The vertical axis of the graph of FIG. 2(*b*) indicates the magnitude of the nonlinear phase rotation amount generated in the optical signal propagating through the optical transmission line 2. As illustrated in the graph of FIG. 2(*a*), the optical power of the optical signal propagating through the optical transmission line 2 attenuates as the distance from the origin increases, is amplified by the optical amplifier 22-1, and then attenuates again as the distance from the origin increases. In this case, the nonlinear phase rotation amount generated in the optical signal propagating through the optical transmission line 2 shows a change proportional to the change in optical power shown in the graph of FIG. 2(*a*) as shown in the graph of FIG. 2(*b*).

The other one of the two optical effects is a linear optical effect caused by wavelength dispersion, as shown in the graph of FIG. 3(*a*). The horizontal axis of the graph of FIG. 3(*a*) indicates the distance in the optical transmission line 2 as in FIGS. 2(*a*) and 2(*b*). The vertical axis of the graph of FIG. 3(*a*) indicates the magnitude of the dispersion amount of the wavelength dispersion caused in the optical signal propagating through the optical transmission line 2. As can be seen from the graph of FIG. 3(a), a certain dispersion amount of the wavelength dispersion occurs in each of the optical fibers 21-1 and 21-2, and the generated dispersion amount varies depending on the types of optical fibers 21-1 and 21-2.

Due to the influence of these two optical effects and other noises, a reception symbol 72, which is the symbol of the reception signal after the coherent detection is performed by the coherent reception unit 11, is in a state in which the constellation is disturbed and the positions of four code points of QPSK cannot be clearly specified as compared with the transmission symbol 71 as illustrated in FIG. 2 and FIG. 3.

The two optical effects generated in the optical transmission line 2 can be modeled by the nonlinear Schrodinger equation from Expression (1) below.

[Math. 1]

$$\frac{\partial E}{\partial z} = -j\frac{\beta}{2}\frac{\partial^2 E}{\partial t^2} + j\gamma P(z)|E|^2 E \tag{1}$$

In Expression (1), E is an optical signal represented by a complex electric field of which power is standardized to one. z is a variable indicating a position on the optical transmission line 2, and is represented by a distance from a connection point between the optical transmission device 3, which is the origin, and the optical transmission line 2. $\beta$ of the first term on the right side is a dispersion coefficient, and t is a variable indicating a time. $\gamma$ of the second term on the right side is a nonlinear constant, and P(z) is a function indicating the optical power distribution in the optical transmission line 2, that is, the optical power of the optical signal at an arbitrary position z on the optical transmission line 2. "j" indicated on the right side is an imaginary unit.

The first term on the right side of Expression (1) represents wavelength dispersion generated in the optical signal propagating through the optical transmission line 2, and the second term on the right side represents nonlinear phase rotation generated in the optical signal propagating through the optical transmission line 2. The nonlinear Schrodinger equation shown in Expression (1) can be solved by, for example, SSFM or the like which is a numerical analysis method.

In the DLM used in the present embodiment, the transmission symbol is restored from the reception signal output from the coherent reception unit 11 by using a technology called digital back propagation (DBP). More specifically, SSFM for an equation obtained by multiplying the right side of Expression (1) by −1 is applied to the reception signal. That is, the optical transmission line 2 is divided into N sections, and in each of the divided N sections, nonlinear phase rotation amounts $\varphi_1$ to $\varphi_N$ indicating the magnitude of the nonlinear phase rotation and the dispersion coefficients $\beta_1$ to $\beta_N$ indicating the magnitude of the wavelength dispersion are appropriately determined, and then an inverse nonlinear phase rotation and an inverse dispersion are alternately applied to the reception signal. Here, N is an integer of two or more, and hereinafter, "n" is used as a symbol indicating an arbitrary integer between one and N.

In the graph of FIG. 2(c) and the graph of FIG. 3(b), an example is shown in which when N=8, the optical transmission line 2 is divided into eight sections such that the section length of each section is the same. The vertical axis of the graph of FIG. 2(c) indicates the nonlinear phase rotation amount similarly to the vertical axis of the graph of FIG. 2(b), and the vertical axis of the graph of FIG. 3(b) indicates the dispersion amount of the wavelength dispersion similarly to the graph of FIG. 3(a). The horizontal axes of the graphs of FIGS. 2(c) and 2(d) and the horizontal axis of the graph of FIG. 3(b) indicate a distance, and there is a relationship in which the direction is opposite to the direction indicated by the horizontal axes of the graphs of FIGS. 2(a) and 2(b) and the horizontal axis of the graph of FIG. 3(a). That is, the connection point between the optical transmission line 2, which is the end point of the optical transmission line 2, and the coherent reception unit 11 is the origin of the horizontal axes of the graphs of FIGS. 2(c) and 2(d) and the horizontal axis of the graph of FIG. 3(b). Moreover, in other words, an arbitrary position in the graphs of FIGS. 2(c) and 2(d) and the graph of FIG. 3(b) is set as "$z_{inv}$", and a distance from the start point to the end point of the optical transmission line 2 is set as "L". In this case, "z" and "$z_{inv}$", which are arbitrary positions on the horizontal axes of the graphs of FIGS. 2(a) and 2(b) and the graph of FIG. 3(a), have a relationship of $z=L-z_{inv}$. Note that since the graphs of FIG. 2(c) and FIG. 3(b) are indicated by the coordinate axis of $z_{inv}$ instead of the coordinate axis of z, the amounts represented by the vertical axis of the graph of FIG. 2(c) and the vertical axis of the graph of FIG. 3(b) are indicated by the names of the estimated inverse nonlinear phase rotation amount and the estimated inverse dispersion amount, respectively.

N nonlinear phase rotation amounts $\varphi_1$ to $\varphi_N$ shown in the graph of FIG. 2(c) affect the reception signal output from the coherent reception unit 11 in a direction opposite to the influence caused by the nonlinear phase rotation occurring in the optical transmission line 2. N dispersion coefficients $\beta_1$ to $\beta_N$ shown in the graph of FIG. 3(b) affect the reception signal output from the coherent reception unit 11 in a direction opposite to the influence caused by the wavelength dispersion occurring in the optical transmission line 2.

Here, it is assumed that the N nonlinear phase rotation amounts $\varphi_1$ to $\varphi_N$ and the N dispersion coefficients $\beta_1$ to $\beta_N$ determined in the SSFM are in a state in which the nonlinear phase rotation and wavelength dispersion actually occurring in the optical transmission line 2 can be approximated. The approximation state means that, for example, in a case where the graph of FIG. 2(c) is a graph line-symmetric with respect to the vertical axis, the shape of the graph substantially matches the shape of the graph of FIG. 2(b), and in a case where the graph of FIG. 3(b) is a graph line-symmetric with respect to the vertical axis, the shape of the graph substantially matches the shape of the graph of FIG. 3(a).

In the case of the approximation state, since the symbol of the signal inversely affected by the SSFM, that is, a restored symbol 73 illustrated in FIG. 2 and FIG. 3 substantially matches the transmission symbol 71, the SNR of the signal inversely affected by the SSFM becomes high. On the other hand, in the case of non-approximation state, the SNR of the signal inversely affected by the SSFM becomes low.

Therefore, in order to update the N nonlinear phase rotation amounts $\varphi_1$ to $\varphi_N$ and N dispersion coefficients $\beta_1$ to $\beta_N$ used in the SSFM so as to increase the SNR, for example, an optimization algorithm such as a gradient method is used. In order to use the optimization algorithm, for example, a predetermined training signal is transmitted to the optical transmission device 3 as a transmission signal. As a result, the coherent reception unit 11 outputs a reception signal for the training signal, and the SSFM is applied to the reception signal. In the optimization algorithm, new N nonlinear phase rotation amounts $\varphi_1$ to $\varphi_N$ and new N dispersion coefficients $\beta_1$ to $\beta_N$ are calculated and applied to the SSFM such that the SNR of the signal inversely affected by the SSFM becomes high on the basis of the signal inversely affected by the SSFM and the known training signal. By repeating the update of the N nonlinear phase rotation amounts $\varphi_1$ to $\varphi_N$ and N dispersion coefficients $\beta_1$ to $\beta_N$ with the optimization algorithm, it is possible to restore the transmission symbol from the reception signal at a high SNR. Note that the transmission signal can be restored from the reception signal when a general optical reception device performs normal demodulation without transmitting the training signal, and thus transmission characteristics can be estimated even during operation.

Figure 4:
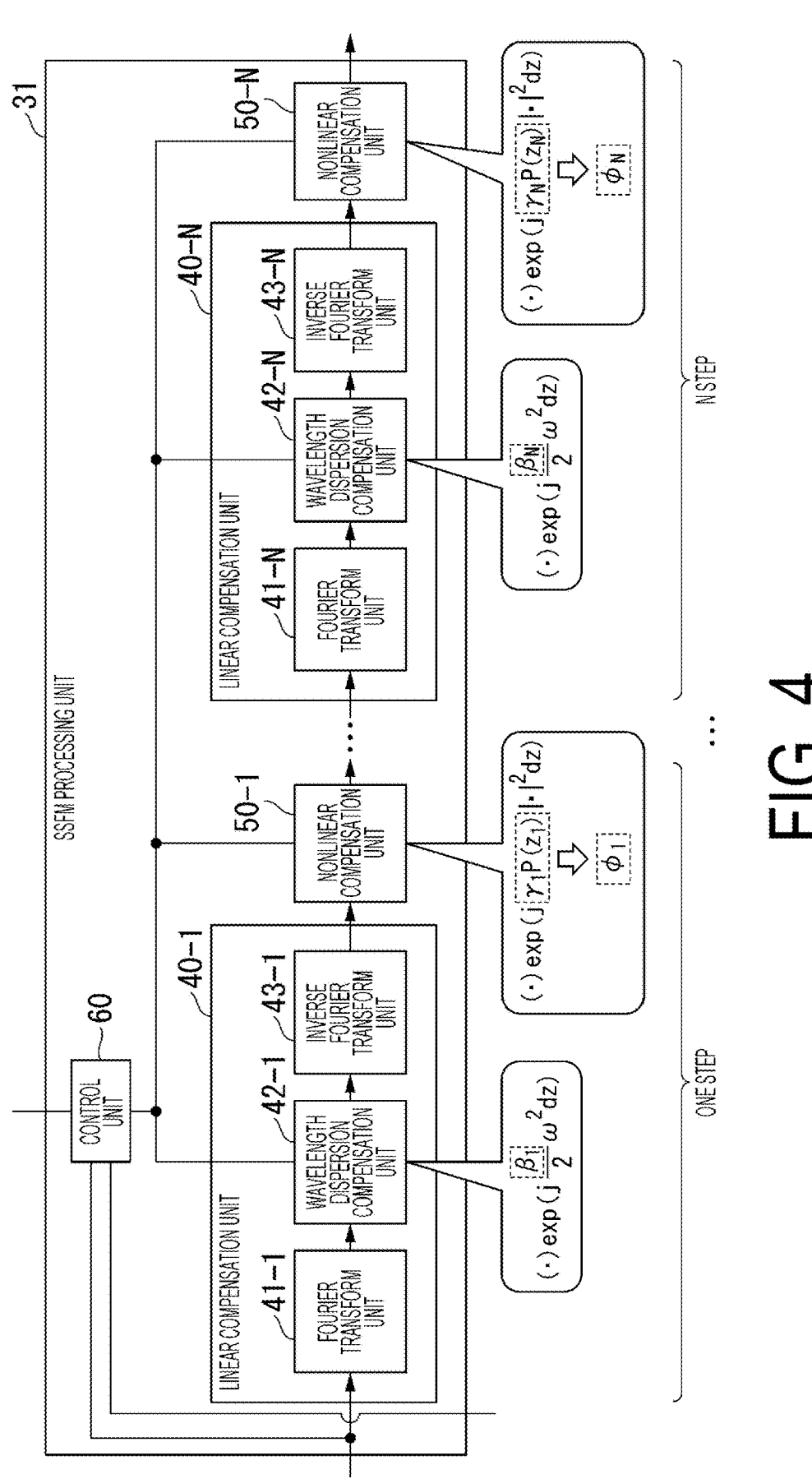
FIG. 4 is a block diagram illustrating a configuration of a split-step Fourier method (SSFM) processing unit according to the first embodiment.

In the compensation processing unit 13, the SSFM processing unit 31 includes N linear compensation units 40-1 to 40-N, N nonlinear compensation units 50-1 to 50-N, and a control unit 60 as illustrated in FIG. 4 in order to perform the above-described SSFM processing. In the SSFM processing unit 31, the linear compensation unit 40-1 is connected to the output side of the coherent reception unit 11, and the nonlinear compensation unit 50-1 is connected to the output side of the linear compensation unit 40-1. First step processing of the SSFM is performed by the linear compensation unit 40-1 and the nonlinear compensation unit 50-1. In the second and subsequent processing, that is, in a case where n is an arbitrary integer between two and N, the linear compensation unit 40-n is connected to the output side of the nonlinear compensation unit 50-(n-1), and the nonlinear compensation unit 50-n is connected to the output side of the linear compensation unit 40-n. The n-th step processing of the SSFM is performed by the linear compensation unit 40-n and the nonlinear compensation unit 50-n.

Hereinafter, n will be described as an arbitrary integer between one and N. The linear compensation unit 40-n includes a Fourier transform unit 41-n, a wavelength dispersion compensation unit 42-n, and an inverse Fourier transform unit 43-n. The Fourier transform unit 41-n performs Fourier transform on the signal provided in the previous stage to convert the signal into a frequency domain signal. Here, the Fourier transform performed by the Fourier transform unit 41-n is, for example, fast Fourier transform (FFT). The wavelength dispersion compensation unit 42-n performs dispersion compensation on the signal on which the Fourier transform unit 41-n has performed Fourier transform by performing an operation represented by Expression (2) below.

[Math. 2]

$$(\cdot)\exp\left(j\frac{\beta_n}{2}\omega^2 dz_n\right) \tag{2}$$

In Expression (2) described above, (·) means the output of the Fourier transform unit 41-n, that is, the signal on which the Fourier transform unit 41-n has performed Fourier transform. "$\beta_n$" is a dispersion coefficient of the n-th step, "$\omega$" is an angular frequency, that is, $\omega=2\pi f$, and f is a frequency in a frequency domain where a signal on which the Fourier transform unit 41-n has performed Fourier transform exists. "$dz_n$" is a step size of the n-th step, and is a section length of the n-th section as viewed from the end point side of the optical transmission line 2 when the optical transmission line 2 is divided into N sections. Here, the reason why "$dz_n$" is set to the n-th section as viewed not from the start point side but from the end point side of the optical transmission line 2 is that the SSFM processing is sequentially performed from the start point on a coordinate axis of $z_{inv}$ as illustrated in FIG. 3(b). "j" is an imaginary unit.

The inverse Fourier transform unit 43-n performs inverse Fourier transform on a signal dispersion-compensated by the wavelength dispersion compensation unit 42-n to convert the signal into a time domain signal. Here, the inverse Fourier transform performed by the inverse Fourier transform unit 43-n is, for example, Inverse Fast Fourier Transform (IFFT).

The nonlinear compensation unit 50-n of the n-th step performs nonlinear phase rotation compensation on the signal on which the inverse Fourier transform unit 43-n has performed inverse Fourier transform by performing an operation represented by Expression (3) below.

[Math. 3]

$$(\cdot)\exp\bigl(j\gamma_n P(z_n)|\cdot|^2 dz_n\bigr) \tag{3}$$

In Expression (3) described above, (·) means the output of the inverse Fourier transform unit 43-n, that is, the signal on which the inverse Fourier transform unit 43-n has performed inverse Fourier transform. "$\gamma_n$" is an n-th step nonlinear constant and is a predetermined constant. $P(z_n)$ is the optical power of an optical signal at a position $z_n$ on the optical transmission line 2. $z_n$ is a distance between a position at the center of the n-th section and the start point of the optical transmission line 2 as viewed from the end point side of the optical transmission line 2 when the optical transmission line 2 is divided into N sections. Here, the reason why "$z_n$" is set to the position at the center of the n-th section as viewed not from the start point side but from the end point side of the optical transmission line 2 is the reason as in the case of "$dz_n$" described above and the reason is that the SSFM processing is sequentially performed from the start point on the coordinate axis of $z_{inv}$ as illustrated in FIG. 2(c). "$|\cdot|^2$" means a value obtained by squaring an absolute value of the output of the inverse Fourier transform unit 43-n. Similarly to Expression (2), "$dz_n$" is the step size of the n-th step, and "j" is an imaginary unit. Note that a nonlinear constant $\gamma_n$ and an optical power $P(z_n)$, and the nonlinear phase rotation amount $\varphi_n$ have a relationship of $\varphi_n=\gamma_n P(z_n)$.

The control unit 60 is connected to the coherent reception unit 11, the coefficient update unit 14, the step size update unit 16, the wavelength dispersion compensation units 42-1 to 42-N, and the nonlinear compensation units 50-1 to 50-N. The control unit 60 sets the nonlinear phase rotation amounts $\varphi_1$ to $\varphi_N$ and the dispersion coefficients $\beta_1$ to $\beta_N$, and sets step sizes $dz_1$ to $dz_N$.

Returning to FIG. 1, the adaptive equalization unit 32 performs, on a signal which is compensated for the wavelength dispersion and the nonlinear phase rotation by the SSFM processing unit 31, waveform distortion compensation caused by separation of a polarization-multiplexed signal, polarization mode dispersion, or the like, by using, for example, a linear filter such as a finite impulse response (FIR) filter, or the like.

The frequency offset compensation unit 33 performs, on a signal which is compensated for by the adaptive equalization unit 32, frequency offset compensation for compensating for a difference in frequency between light emitted from a signal light source included in the optical transmission device 3 and light emitted from the local oscillation light source included in the coherent reception unit 11.

The carrier phase noise compensation unit 34 performs, on a signal subjected to the frequency offset compensation by the frequency offset compensation unit 33, phase offset compensation for compensating for a phase difference between light emitted from the signal light source included in the optical transmission device 3 and light emitted from the local oscillation light source included in the coherent reception unit 11.

The coefficient update unit 14 is a functional unit that performs the above-described DBP processing. The coefficient update unit 14 stores in advance the training signal transmitted by the optical transmission device 3 in an internal storage area. The coefficient update unit 14 applies a predetermined evaluation function to a signal obtained after the compensation processing unit 13 performs compensation on the reception signal obtained when the optical transmission device 3 transmits the training signal and the training signal stored in the internal storage area, and calculates new N nonlinear phase rotation amounts $\varphi_1$ to $\varphi_N$ and new N dispersion coefficients $\beta_1$ to $\beta_N$ according to an optimization algorithm that minimizes a value of the evaluation function.

Here, as the evaluation function, for example, in a case where new N nonlinear phase rotation amounts $\varphi_1$ to $\varphi_N$ and new N dispersion coefficients $\beta_1$ to $\beta_N$ are calculated so as to increase the SNR of the signal subjected to compensation by the compensation processing unit 13, a function for calculating a smaller value is applied as the SNR of the signal subjected to compensation by the compensation processing unit 13 increases. However, the evaluation function is not limited to such a function, and may be a function that calculates a square error of the signal subjected to compensation by the compensation processing unit 13 and the training signal, an evaluation function disclosed in Patent Literature 1, or other evaluation functions.

As an optimization algorithm applied to the coefficient update unit 14, a method of optimizing the nonlinear phase rotation amounts $\varphi_1$ to $\varphi_N$ and the dispersion coefficients $\beta_1$ to $\beta_N$ one by one, the method being disclosed in Patent Literature 1, may be applied, or a gradient method such as a backpropagation method or a steepest descent method and an existing learning processing method used in other machine learning fields may be applied.

The transmission characteristic calculation unit 15 calculates the transmission characteristics of the optical transmission line 2 on the basis of the nonlinear phase rotation amount $\varphi_n$ and the dispersion coefficient $\beta_n$, which are calculated by the coefficient update unit 14. The nonlinear phase rotation amount $\varphi_n$ and the dispersion coefficient $\beta_n$, which are calculated by the coefficient update unit 14, are discrete values. Therefore, the transmission characteristic calculation unit 15 calculates the optical power distribution indicating the transmission characteristics of the optical transmission line 2 and the dispersion distribution as below.

The transmission characteristic calculation unit 15 divides the nonlinear phase rotation amounts $\varphi_1$ to $\varphi_N$ calculated by the coefficient update unit 14 by the corresponding nonlinear constants $\gamma_1$ to $\gamma_N$, respectively and calculates the estimated optical power at each of the N positions on the coordinate axis of $z_{inv}$ as shown in the graph of FIG. 2(*d*). The transmission characteristic calculation unit 15 linearly interpolates the calculated N estimated optical powers to calculate a function $P(z_{inv})$ indicating the distribution of the estimated optical power on the coordinate axis of $z_{inv}$. The transmission characteristic calculation unit 15 converts the calculated function $P(z_{inv})$ into a function of z, and sets the function P(z) indicating the estimated optical power at an arbitrary position z of the optical transmission line 2 as the estimated optical power distribution of the optical transmission line 2.

The transmission characteristic calculation unit 15 linearly interpolates the dispersion coefficient $\beta_n$ output from the coefficient update unit 14 to calculate a function $\beta(z_{inv})$ of the estimated inverse dispersion coefficient on the coordinate axis of $z_{inv}$. The transmission characteristic calculation unit 15 converts the calculated function $\beta(z_{inv})$ into a function of z, and sets the function $\beta(z)$ indicating the estimated dispersion coefficient at an arbitrary position z of the optical transmission line 2 as the estimated dispersion distribution of the optical transmission line 2. The function P(z) and the function $\beta(z)$, which are calculated by the transmission characteristic calculation unit 15, indicate the transmission characteristics of the optical transmission line 2.

Figure 5:
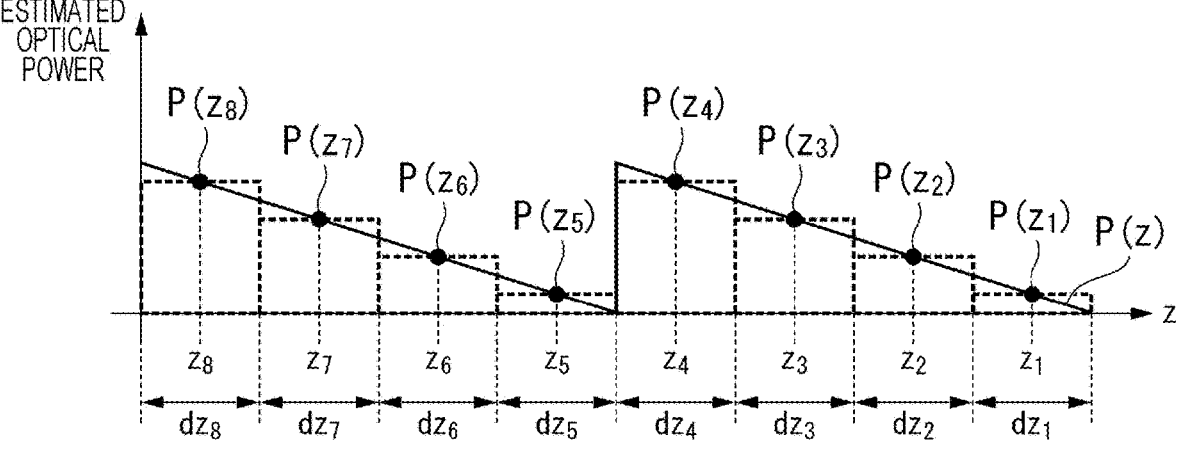
FIG. 5 is a diagram illustrating a relationship between estimated optical power and a step size according to the first embodiment.

The step size update unit 16 detects a new step size $dz_n$. Here, the relationship between the function P(z) indicating the estimated optical power distribution and the step size $dz_n$ will be described with reference to FIG. 5. The graph of FIG. 5 illustrates an example in which the optical transmission line 2 is equally divided into eight sections when N=8, that is, an example in which each of the eight step sizes $dz_1$ to $dz_8$ has the same length. Note that as described above, the order of arrangement of the step sizes $dz_1$ to $dz_8$ and the order of arrangement of the central positions $z_1$ to $z_8$ of the step sizes $dz_1$ to $dz_8$ are in the order from the end point side of the optical transmission line 2. In the graph of FIG. 5, the horizontal axis indicates a distance in the optical transmission line 2 as in FIGS. 2(*a*) and 2(*b*), and FIG. 3(*a*), and the vertical axis indicates the magnitude of the estimated optical power.

Figure 16:
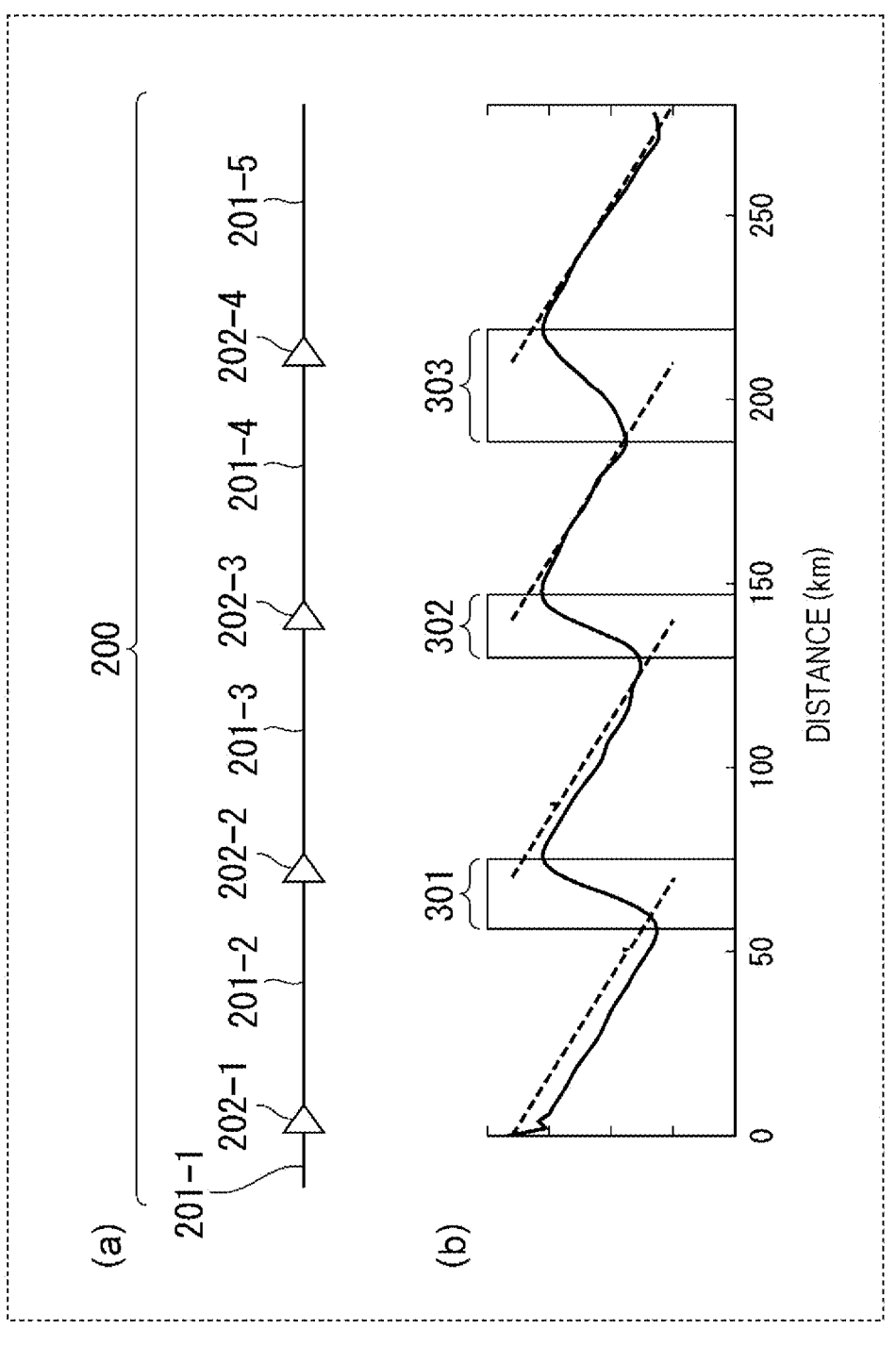
FIG. 16 is a graph showing measurement results of measurement by an OTDR and measurement by a DLM.

Regarding the estimation of the optical power distribution among the transmission characteristics to be estimated, as shown in the graph of FIG. 5, the method of estimating the transmission characteristics by the SSFM and DBP described above can be said to be a method of calculating the estimated optical powers $P(z_1)$ to $P(z_8)$ by estimating $\gamma_1 P(z_1) dz_1$ to $\gamma_8 P(z_8) dz_8$ corresponding to the area of the rectangles formed by the broken line and dividing the $\gamma_1 P(z_1) dz_1$ to $\gamma_8 P(z_8) dz_8$ by the nonlinear constants $\gamma_1$ to $\gamma_8$ and step sizes $dz_1$ to $dz_8$ in eight positions $z_1$ to $z_8$ in the eight sections. However, when each of the step sizes $dz_1$ to $dz_n$ has the same length, a measurement dead zone as illustrated in FIG. 16 is generated. Therefore, on the basis of the function P(z) indicating the estimated optical power distribution, the function $\beta(z)$ indicating the estimated dispersion distribution, and the signal bandwidth of the optical transmission line 2, the step size update unit 16 detects a combination of new step sizes $dz_1$ to $dz_N$ applied in each of the N steps of the SSFM processing unit 31 such that the proportional relationship represented by Expression (4) below is established under the condition that the sum of the new step sizes $dz_1$ to $dz_N$ becomes a distance "L" between the start point and the end point of the optical transmission line 2.

[Math. 4]

$$dz(z) \propto P(z)^p \big(\beta(z) \cdot Bw^2\big)^q \qquad (4)$$

In Expression (4) described above, "p" and "q" are arbitrary real numbers determined in advance. "Bw" is a signal bandwidth of the optical transmission line 2 and is a predetermined value. dz(z) is a function indicating a step size at an arbitrary position z in the optical transmission line 2. The step size update unit 16 changes the length of the step size $dz_n$ in accordance with the magnitude of the estimated optical power $P(z)$ and the magnitude of the dispersion coefficient $\beta(z)$ so as to satisfy the proportional relationship represented by Expression (4), and thus the width of the rectangle formed by the broken line illustrated in FIG. 5, that is, the width for performing the piecewise quadrature is changed. This makes it possible to increase or decrease the estimated optical powers $P(z_1)$ to $P(z_8)$ for respective sections. Therefore, by setting the values of "p" and "q" in Expression (4) to appropriate values, the estimated optical power in the section near the measurement dead zone can be made an appropriate magnitude, and the estimation accuracy can be increased without increasing the optical power of the optical signal transmitted by the optical transmission device 3.

When the step size update unit 16 determines that the newly detected step size is optimal, the estimation result output unit 17 outputs the function $P(z)$ indicating the transmission characteristics used for calculating the new step size and the function $\beta(z)$ to the outside.

(Processing by Optical Reception Device of First Embodiment)

Figure 8:
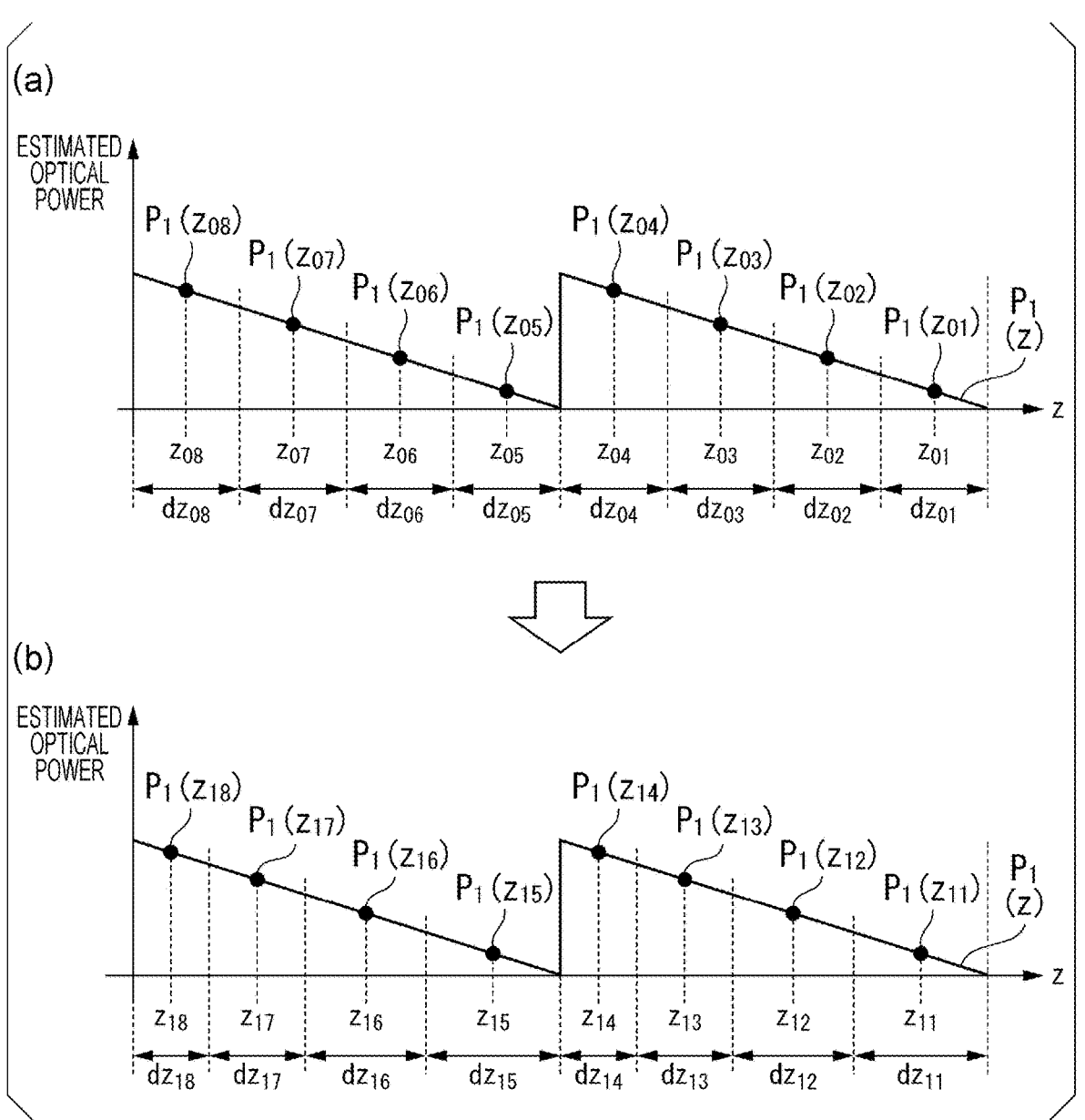
FIG. 8 is a diagram illustrating an outline of a step size change by a step size update unit according to the first embodiment.

Next, processing by the optical reception device 1 will be described with reference to FIGS. 6 to 8. FIG. 6 is a flowchart illustrating a flow of processing by the optical reception device 1. Before the flowchart of FIG. 6 is started, initial setting below is performed in the optical reception device 1.

In each of the adaptive equalization unit 32, the frequency offset compensation unit 33, and the carrier phase noise compensation unit 34, a compensation coefficient calculated in advance for each of the adaptive equalization unit 32, the frequency offset compensation unit 33, and the carrier phase noise compensation unit 34 is set. As a method of calculating the compensation coefficient for each of the adaptive equalization unit 32, the frequency offset compensation unit 33, and the carrier phase noise compensation unit 34, for example, a conventionally used calculation method can be applied. Predetermined nonlinear constants $\gamma_1$ to $\gamma_N$ and a value indicating the distance "L" between the start point and the end point of the optical transmission line 2 used to convert the coordinate axis of $z_{inv}$ into the coordinate axis of z are written in advance in the storage area inside the transmission characteristic calculation unit 15.

The initial values of the dispersion coefficients $\beta_1$ to $\beta_N$, the initial values of the nonlinear phase rotation amounts $\varphi_1$ to $\varphi_N$, and the initial values of the step sizes $dz_1$ to $dz_N$ are written in advance in the storage area inside the control unit 60 of the SSFM processing unit 31. As the initial values of the dispersion coefficients $\beta_1$ to $\beta_N$ and the initial values of the nonlinear phase rotation amounts $\varphi_1$ to $\varphi_N$, arbitrarily determined values may be applied. For example, the initial values of the dispersion coefficients $\beta_1$ to $\beta_N$ and the initial values of the nonlinear phase rotation amounts $\varphi_1$ to $\varphi_N$ may be set to "zero". As the dispersion coefficients $\beta_1$ to $\beta_N$, dispersion coefficients may be used which is obtained by dividing a total dispersion amount of the optical transmission line 2 estimated by a method of the related art by a division number N. As the initial values of the step sizes $dz_1$ to $dz_N$, a length of one section length when the optical transmission line 2 is equally divided into N sections is applied.

Data of the training signal transmitted by the optical transmission device 3 is written in advance in the storage area inside the coefficient update unit 14. In the storage area inside the coefficient update unit 14, two thresholds of which appropriate values are determined in advance is written in advance, for example, a threshold for convergence determination of the dispersion coefficient and a threshold for convergence determination of the nonlinear phase rotation amount are written in advance. An area for storing the previous dispersion coefficients $\beta_1$ to $\beta_N$ and the previous nonlinear phase rotation amounts $\varphi_1$ to $\varphi_N$ is provided in the storage area inside the coefficient update unit 14, and the initial values of the dispersion coefficients $\beta_1$ to $\beta_N$ and the initial values of the nonlinear phase rotation amounts $\varphi_1$ to $\varphi_N$, which are written in the storage area inside the control unit 60, are written in advance.

A threshold $\varepsilon$ for performing convergence determination of the step size is written in advance in the storage area inside the step size update unit 16. The value of the threshold $\varepsilon$ is a positive real number, and an appropriate value for convergence determination of the step size is determined in advance. Predetermined values of "p" and "q", a predetermined value indicating a signal bandwidth "Bw" of the optical transmission line 2, and a value indicating a distance "L" between the start point and the end point of the optical transmission line 2 are written in advance in the storage area inside the step size update unit 16. The predetermined nonlinear constants $\gamma_1$ to $\gamma_N$ are written in advance in the storage area inside the step size update unit 16. An area for storing a counter k indicating the number of repetitions is provided in the storage area inside the step size update unit 16, and is initialized as k=1. A region for storing previous $P_{k-1}(z_1)$ to $P_{k-1}(z_N)$ is provided in the storage region inside the step size update unit 16, and $P_0(z_1)$ to $P_0(z_N)$ calculated by dividing each of the initial values of the nonlinear phase rotation amounts $\varphi_1$ to $\varphi_N$ by each of the corresponding nonlinear constants $\gamma_1$ to $\gamma_N$ are written in advance as the initial values in the storage area. Note that a subscript of the letter P indicates the number of repetitions of the processing of the step size update unit 16.

In a state in which the initial setting of the optical reception device 1 described above is completed, the optical transmission device 3 generates a polarization-multiplexed QPSK optical signal by using a predetermined training signal as a transmission signal, and transmits the generated polarization-multiplexed QPSK optical signal to the optical reception device 1 via the optical transmission line 2. The coherent reception unit 11 of the optical reception device 1 receives the polarization-multiplexed QPSK optical signal transmitted through the optical transmission line 2. The coherent reception unit 11 performs coherent detection on the received polarization-multiplexed QPSK optical signal to generate a reception signal (step S1).

When fetching the reception signal output from the coherent reception unit 11, the control unit 60 of the SSFM processing unit 31 sets the initial values of the dispersion coefficients $\beta_1$ to $\beta_N$ and the step sizes $dz_1$ to $dz_N$, which are stored in the internal storage area, to the corresponding wavelength dispersion compensation units 42-1 to 42-N, respectively. The control unit 60 sets the initial values of the nonlinear phase rotation amounts $\varphi_1$ to $\varphi_N$ and the step sizes $dz_1$ to $dz_N$, which are stored in the internal storage area, to the corresponding nonlinear compensation units 50-1 to 50-N, respectively. Note that in the first processing in step S2, since the step sizes $dz_1$ to $dz_N$ output from the step size update unit 16 are not fetched, the control unit 60 sets the initial values of the step sizes $dz_1$ to $dz_N$ stored in the internal storage area to the wavelength dispersion compensation units 42-1 to 42-N and the nonlinear compensation units 50-1 to 50-N corresponding thereto, respectively. In the second and subsequent processing in step S2, since the step sizes $dz_1$ to $dz_N$ output from the step size update unit 16 are fetched, the control unit 60 sets the fetched step sizes $dz_1$ to $dz_N$ to the corresponding wavelength dispersion compensation units 42-1 to 42-N and the corresponding nonlinear compensation units 50-1 to 50-N, respectively (step S2).

Thereafter, the processing of N steps by the SSFM processing unit 31 described above is performed on the reception signal output from the coherent reception unit 11. Hereinafter, the processing in the first step will be described. The Fourier transform unit 41-1 of the linear compensation unit 40-1 fetches the reception signal output from the coherent reception unit 11. Note that the fetching of the reception signal by the Fourier transform unit 41-1 and the fetching of the reception signal by the control unit 60 are performed in parallel. The Fourier transform unit 41-1 executes FFT on the fetched reception signal and outputs the signal subjected to the FFT to the wavelength dispersion compensation unit 42-1. The wavelength dispersion compensation unit 42-1 fetches the signal subjected to the FFT, which is output from the Fourier transform unit 41-1. After the setting of the dispersion coefficient $\beta_1$ and step size $dz_1$ by the control unit 60 is completed, the wavelength dispersion compensation unit 42-1 performs dispersion compensation by performing the operation of Expression (2), that is, the operation of multiplying the fetched signal subjected to the FFT by $\exp(j\beta_1/2\omega^2 dz_1)$. The wavelength dispersion compensation unit 42-1 outputs the signal subjected to the dispersion compensation to the inverse Fourier transform unit 43-1.

The inverse Fourier transform unit 43-1 fetches the signal subjected to the dispersion compensation, which is output from the wavelength dispersion compensation unit 42-1, performs IFFT on the fetched signal subjected to the dispersion compensation, and outputs the signal subjected to the IFFT to the nonlinear compensation unit 50-1. The nonlinear compensation unit 50-1 fetches the signal subjected to the IFFT, which is output from the inverse Fourier transform unit 43-1, and performs the operation of Expression (3) on the fetched signal subjected to the IFFT to compensate for the nonlinear phase rotation. The nonlinear compensation unit 50-1 outputs the signal subjected to compensation for the nonlinear phase rotation to the Fourier transform unit 41-2 of the linear compensation unit 40-2.

Thereafter, similarly to the processing of the first step described above, the processing in the second and subsequent steps is performed in the order of steps by the linear compensation unit 40-*n* (where n=2 to N) and the nonlinear compensation unit 50-*n* (where n=2 to N). The nonlinear compensation unit 50-N in the N-th step outputs the signal subjected to compensation for the nonlinear phase rotation to the adaptive equalization unit 32 (step S3).

The adaptive equalization unit 32 fetches the signal subjected to compensation for the nonlinear phase rotation, which is output from the nonlinear compensation unit 50-N, and performs an adaptive equalization processing on the fetched signal subjected to compensation for the nonlinear phase rotation. The adaptive equalization unit 32 outputs the signal subjected to the adaptive equalization to the frequency offset compensation unit 33. The frequency offset compensation unit 33 fetches the signal subjected to the adaptive equalization, which is output from the adaptive equalization unit 32, and performs frequency offset compensation processing on the fetched signal subjected to the adaptive equalization. The frequency offset compensation unit 33 outputs the signal subjected to the frequency offset compensation to the carrier phase noise compensation unit

34. The carrier phase noise compensation unit 34 performs phase offset compensation processing on the signal subjected to the frequency offset compensation, which is output from the frequency offset compensation unit 33. The carrier phase noise compensation unit 34 outputs the signal subjected to the phase offset compensation to the coefficient update unit 14 (step S4).

The coefficient update unit 14 fetches the signal subjected to the phase offset compensation, which is output from the carrier phase noise compensation unit 34, applies an evaluation function to the fetched signal subjected to the phase offset compensation and the training signal stored in the internal storage area, and calculates new N dispersion coefficients $\beta_1$ to $\beta_N$ and new N nonlinear phase rotation amounts $\varphi_1$ to $\varphi_N$ according to an optimization algorithm that minimizes a value of the evaluation function (step S5).

The coefficient update unit 14 determines whether or not the dispersion coefficients $\beta_1$ to $\beta_N$ and the nonlinear phase rotation amounts $\varphi_1$ to $\varphi_N$ converge on the basis of the calculated new dispersion coefficients $\beta_1$ to $\beta_N$, the previous dispersion coefficients $\beta_1$ to $\beta_N$ and a threshold for convergence determination of the dispersion coefficients, which are stored in the internal storage area, the calculated new nonlinear phase rotation amounts $\varphi_1$ to $\varphi_N$, and the previous nonlinear phase rotation amounts $\varphi_1$ to $\varphi_N$ and a threshold for convergence determination of the nonlinear phase rotation amounts, which are stored in the internal storage area. For example, the coefficient update unit 14 calculates the sum of square errors of each of new dispersion coefficients $\beta_1$ to $\beta_N$ and the previous dispersion coefficients $\beta_1$ to $\beta_N$ respectively corresponding to the new dispersion coefficients, and determines that the dispersion coefficients $\beta_1$ to $\beta_N$ converge in a case where the calculated sum of square errors is less than a threshold for convergence determination of the dispersion coefficient. Furthermore, the sum of squared errors of each of new nonlinear phase rotation amounts $\varphi_1$ to $\varphi_N$ and the previous nonlinear phase rotation amounts $\varphi_1$ to $\varphi_N$ respectively corresponding to the new nonlinear phase rotation amounts is calculated, and in a case where the calculated sum of squared errors is less than a threshold for convergence determination of the nonlinear phase rotation amount, it is determined that the nonlinear phase rotation amounts $\varphi_1$ to $\varphi_N$ converge. Note that the coefficient update unit 14 may determine that the dispersion coefficients $\beta_1$ to $\beta_N$ and the nonlinear phase rotation amounts $\varphi_1$ to $\varphi_N$ converge in a case where both the dispersion coefficients $\beta_1$ to $\beta_N$ and the nonlinear phase rotation amounts $\varphi_1$ to $\varphi_N$ converge, or may determine that the dispersion coefficients $\beta_1$ to $\beta_N$ and the nonlinear phase rotation amounts $\varphi_1$ to $\varphi_N$ converge in a case where any one of the dispersion coefficients $\beta_1$ to $\beta_N$ or the nonlinear phase rotation amounts $\varphi_1$ to $\varphi_N$ converge. Furthermore, a value indicating an error other than the sum of square errors may be calculated as a comparison target for convergence determination (step S6).

In a case where it is determined in step S6 that the dispersion coefficients $\beta_1$ to $\beta_N$ and the nonlinear phase rotation amounts $\varphi_1$ to $\varphi_N$ do not converge (Step S6, No), the coefficient update unit 14 writes new dispersion coefficients $\beta_1$ to $\beta_N$ in the area of the internal storage area in which the previous dispersion coefficients $\beta_1$ to $\beta_N$ are stored, and writes new nonlinear phase rotation amounts $\varphi_1$ to $\varphi_N$ in the area of the internal storage area in which the previous nonlinear phase rotation amounts $\varphi_1$ to $\varphi_N$ are stored. The coefficient update unit 14 outputs the new dispersion coefficients $\beta_1$ to $\beta_N$ and the new nonlinear phase rotation amounts $\phi_1$ to $\phi_N$ to the control unit 60 of the SSFM processing unit 31.

The control unit 60 fetches the new dispersion coefficients $\beta_1$ to $\beta_N$ and the new nonlinear phase rotation amounts $\phi_1$ to $\phi_N$, which are output from the coefficient update unit 14. The coefficient update unit 14 rewrites and updates each of the dispersion coefficients $\beta_1$ to $\beta_N$ set to the wavelength dispersion compensation units 42-1 to 42-N with the fetched dispersion coefficients $\beta_1$ to $\beta_N$ respectively corresponding to the dispersion coefficients. The coefficient update unit 14 rewrites and updates each of the nonlinear phase rotation amounts $\phi_1$ to $\phi_N$ set in the nonlinear compensation units 50-1 to 50-N with the fetched nonlinear phase rotation amounts $\phi_1$ to $\phi_N$ respectively corresponding to the nonlinear phase rotation amounts. Note that, at the time of the update, the step sizes $dz_1$ to $dz_N$ set in the wavelength dispersion compensation units 42-1 to 42-N and the nonlinear compensation units 50-1 to 50-N are not updated (step S7). Thereafter, processing of step S3 is performed.

On the other hand, in a case where it is determined in step S6 that the dispersion coefficients $\beta_1$ to $\beta_N$ and the nonlinear phase rotation amounts $\phi_1$ to $\phi_N$ converge (Step S6, Yes), the coefficient update unit 14 performs initializing processing by writing the initial values of the dispersion coefficients $\beta_1$ to $\beta_N$ in the area of the internal storage area in which the previous dispersion coefficients $\beta_1$ to $\beta_N$ are stored, and writing the initial values of the nonlinear phase rotation amounts $\phi_1$ to $\phi_N$ in the area of the internal storage area in which the previous nonlinear phase rotation amounts $\phi_1$ to $\phi_N$ are stored. For example, the coefficient update unit 14 stores in advance the initial values of the dispersion coefficients $\beta_1$ to $\beta_N$ and the initial values of the nonlinear phase rotation amounts $\phi_1$ to $\phi_N$ in another area of the internal storage area, and performs initialization by using the initial values of the dispersion coefficients $\beta_1$ to $\beta_N$ and the initial values of the nonlinear phase rotation amounts $\phi_1$ to $\phi_N$, which are stored in the another area. The coefficient update unit 14 outputs new N dispersion coefficients $\beta_1$ to $\beta_N$ and new N nonlinear phase rotation amounts $\phi_1$ to $\phi_N$ to the transmission characteristic calculation unit 15.

The transmission characteristic calculation unit 15 fetches the new N dispersion coefficients $\beta_1$ to $\beta_N$ and the new N nonlinear phase rotation amounts $\phi_1$ to $\phi_N$, which are output from the coefficient update unit 14. The transmission characteristic calculation unit 15 calculates the function $\beta(z)$ indicating the estimated dispersion distribution of the optical transmission line 2 from the fetched new N dispersion coefficients $\beta_1$ to $\beta_N$ by the above-described procedure. The transmission characteristic calculation unit 15 calculates the function $P(z)$ indicating the estimated optical power distribution of the optical transmission line 2 from the fetched new N nonlinear phase rotation amounts $\phi_1$ to $\phi_N$ and the nonlinear constants $\gamma_1$ to $\gamma_N$ stored in the internal storage area by the above-described procedure. The transmission characteristic calculation unit 15 outputs the calculated function $\beta(z)$ and function $P(z)$ to the step size update unit 16 as the transmission characteristics of the optical transmission line 2 (step S8).

The step size update unit 16 fetches the function $\beta(z)$ indicating the transmission characteristics output from the transmission characteristic calculation unit 15 and the function $P(z)$, and starts a subroutine of the step size update processing illustrated in FIG. 7 (step S9).

The step size update unit 16 reads "p", "q", the signal bandwidth "Bw" of the optical transmission line 2, and the distance "L" between the start point and the end point of the optical transmission line 2 from the internal storage area. The step size update unit 16 generates the fetched function (z) and function $P(z)$, and a function represented by the expression on the right side of Expression (4) with the read "p", "q", and "Bw". Under the condition that the sum of the new step sizes $dz_1$ to $dz_N$ becomes the distance "L" between the start point and the end point of the optical transmission line 2, the step size update unit 16 detects a combination of the new step sizes $dz_1$ to $dz_N$ that satisfies Expression (4) while increasing or decreasing the entire step sizes $dz_1$ to $dz_N$ by, for example, binary search (step Sa1).

For example, it is assumed that the function $P(z)$ indicating the estimated optical power distribution fetched by the step size update unit 16 is $P_1(z)$ illustrated in FIGS. 8(a) and 8(b). FIGS. 8(a) and 8(b) illustrate a case where N=8, and FIG. 8(a) illustrates a case where step sizes $dz_{01}$ to $dz_{08}$ all having the same length are applied as the initial values of the step sizes $dz_1$ to $dz_8$. The relationship between the estimated optical powers $P_1(z_{01})$ to $P_1(z_{08})$ at the central positions $z_{01}$ to $z_{08}$ of the step sizes $dz_{01}$ to $dz_{08}$ and the nonlinear phase rotation amounts $\phi_1$ to $\phi_8$ fetched by the transmission characteristic calculation unit 15 is a relationship of $\phi_1=\gamma_1\times P_1(z_{01})$, ..., $\phi_8=\gamma_8\times P_1(z_{08})$.

Here, it is assumed that the step size update unit 16 detects a combination of the step sizes $dz_{11}$ to $dz_{18}$ illustrated in FIG. 8(b) as the new step sizes $dz_1$ to $dz_8$. In this case, the central positions of the step sizes $dz_{11}$ to $dz_{18}$ are $z_{11}$ to $z_{18}$, which are different from the original positions $z_{01}$ to $z_{08}$. Therefore, the estimated optical powers $P_1(z_{11})$ to $P_1(z_{18})$ of $z_{11}$ to $z_{18}$ and the estimated optical powers $P_1(z_{01})$ to $P_1(z_{08})$ of $z_{01}$ to $z_{08}$ respectively corresponding to $z_{11}$ to $z_{18}$ have different values.

Returning to FIG. 7, the step size update unit 16 calculates new $z_1$ to $z_N$ from the detected new step sizes $dz_1$ to $dz_N$ (step Sa2).

Returning to FIG. 6, the step size update unit 16 reads $P_{k-1}(z_1)$ to $P_{k-1}(z_N)$, which are the previous estimated optical powers, from the internal storage area. Note that in the first time, since $P_0(z_1)$ to $P_0(z_N)$ are written as initial values in the internal storage area, the step size update unit 16 reads $P_0(z_1)$ to $P_0(z_N)$.

The step size update unit 16 substitutes the new $z_1$ to $z_N$ calculated in step Sa2 of the subroutine of the step size update processing into the function $P(z)$ to calculate $P_k(z_1)$ to $P_k(z_N)$, and determines whether or not the Expression (5) is satisfied on the basis of the calculated $P_k(z_1)$ to $P_k(z_N)$ and the read $P_{k-1}(z_1)$ to $P_{k-1}(z_N)$.

[Math. 5]

$$\max(|P_k(z_n) - P_{k-1}(z_n)|) < \varepsilon \tag{5}$$

That is, the step size update unit 16 performs N operations of $|P_k(z_1)-P_{k-1}(z_1)|$, ..., $|P_k(z_N)-P_{k-1}(z_N)|$, and determines whether or not the maximum value among the results from the operations is less than a threshold $\varepsilon$ stored in the internal storage area. When Expression (5) is satisfied, the step size update unit 16 determines that the new step sizes $dz_1$ to $dz_N$ converge and are optimized. On the other hand, when Expression (5) is not satisfied, the step size update unit 16 determines that the new step sizes $dz_1$ to $dz_N$ do not converge and are not optimized (step S10).

In a case where it is determined that Expression (5) is not satisfied, that is, the new step sizes $dz_1$ to $dz_N$ do not converge (Step S10, No), the step size update unit 16 sets a value obtained by adding one to the value of the counter k stored in the internal storage area as the value of the new counter k. The step size update unit 16 outputs the new step sizes $dz_1$ to $dz_N$ detected in step Sa1 of the subroutine of the step size update processing to the control unit 60 of the SSFM processing unit 31 (step S11). Thereafter, the processing proceeds to step S2.

On the other hand, in step S10, in a case where it is determined that Expression (5) is satisfied, that is, the new step sizes $dz_1$ to $dz_N$ converge and is optimized (Step S10, Yes), at the time point, the step size update unit 16 outputs the function P(z) indicating the fetched transmission characteristics, that is, the estimated optical power distribution and the function β(z) indicating the estimated dispersion distribution to the estimation result output unit 17. The estimation result output unit 17 fetches the function P(z) and the function β(z), which are output from the step size update unit 16, and outputs the fetched function P(z) and function β(z) to the outside as the estimation results of the transmission characteristics (step S12). According to this, a series of processing ends.

(Experimental Result)

Figure 9:
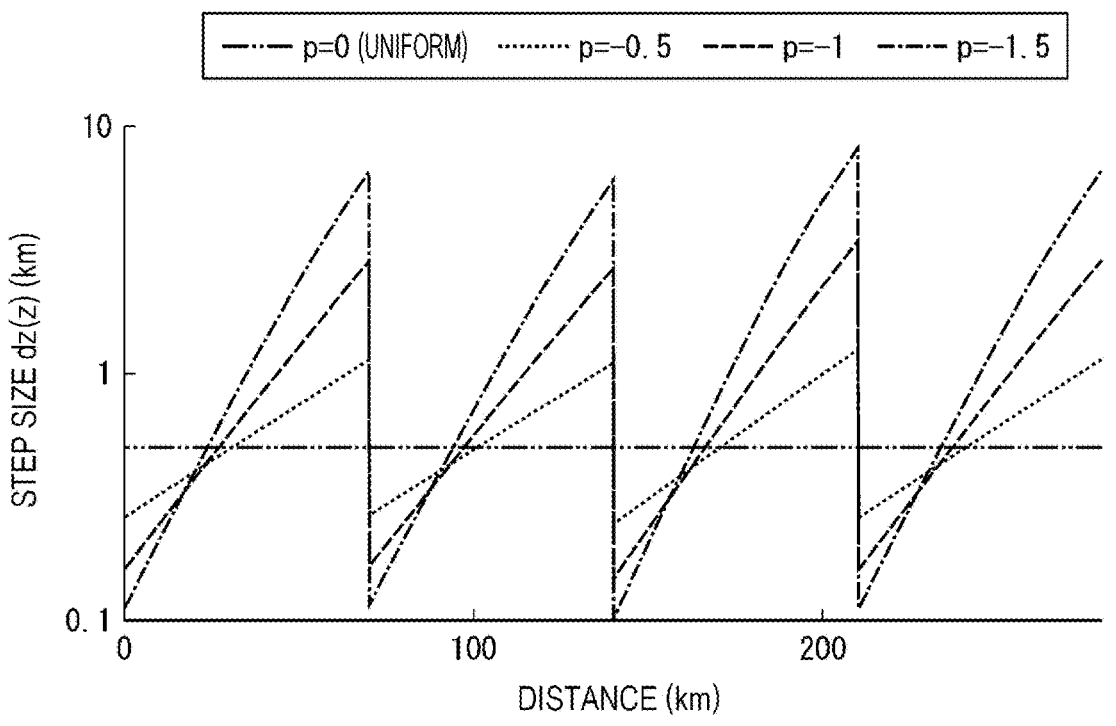
FIG. 9 is a graph (part 1) illustrating an experimental result obtained by using an optical reception device according to the first embodiment.
Figure 10:
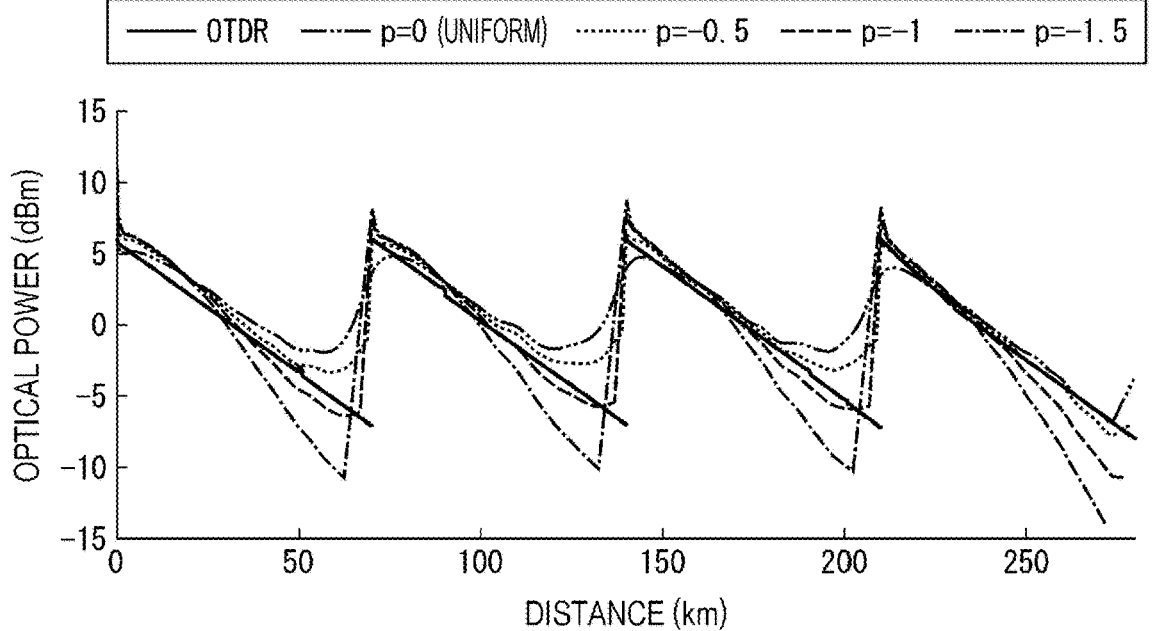
FIG. 10 is a graph (part 2) illustrating an experimental result obtained by using an optical reception device according to the first embodiment.

FIG. 9 and FIG. 10 are graphs illustrating experimental results in a case where the optical transmission line 2 includes four optical fibers of 70 km and three optical amplifiers inserted between the four optical fibers. In this experiment, since the function β(z) indicating the dispersion distribution has a constant value, Expression (4) is replaced with Expression (6) below.

[Math. 6]

$$dz(z) \propto P(z)^p \tag{6}$$

In this experiment, four values of "0", "−0.5", "−1", and "−1.5" are used as the value of "p". The graph of FIG. 9 is a graph illustrating a change in a function dz(z) indicating the step size for each position z of the optical transmission line 2 at each value of p. In the graph of FIG. 9, the horizontal axis represents a distance represented in units [km], and the origin is the start point of the optical transmission line 2. The vertical axis represents a value of the function dz(z) indicating the step size, and the unit is [km]. In FIG. 9, a two-dot line graph corresponds to a case of p=0, a dotted line graph corresponds to a case of p=−0.5, a broken line graph corresponds to a case of p=−1, and a one-dot line graph corresponds to a case of p=−1.5.

In the graph of FIG. 9, in the case of p=0, since the right side of Expression (6) is a constant, dz(z) indicates a case of a constant value, that is, a case where each of the step sizes $dz_1$ to $dz_N$ has the same length at an arbitrary position z of the optical transmission line 2.

The graph of FIG. 10 is a graph illustrating a change in optical power of the absolute value (absolute power) for each position z of the optical transmission line 2 at each value of p. In the graph of FIG. 10, similarly to the graph of FIG. 9, the horizontal axis represents a distance represented in units [km], and the origin is the start point of the optical transmission line 2. The vertical axis indicates the magnitude of the optical power, and a unit is [dBm]. Here, the optical power indicates a value obtained by adding the measured value obtained by the OTDR to the optical fiber input power in the case of using the OTDR, and is a value of the function P(z) of the estimated optical power in a case where the step sizes $dz_1$ to $dz_N$ output by the estimation result output unit 17 are optimal in the case of using the optical reception device 1 of the present embodiment. In FIG. 10, a graph with a solid line indicates a measured value obtained by the OTDR, and a graph other than the solid line indicates a change in the function P(z) of the estimated optical power. In FIG. 10, the correspondence relationship between the line type of each of the two-dot line graph, the dotted line graph, the broken line graph, and the one-dot line graph and the value of p is the same as that in the graph of FIG. 9.

As can be seen from the graph of FIG. 10, the change in the broken line graph of p=−1 can follow the change in the measured value obtained by the OTDR indicated by the solid line even in the vicinity of the optical amplifier, which is the measurement dead zone. On the other hand, in a case other than p=−1, it can be seen that the deviation occurs from the change in the measured value obtained by the OTDR, which is indicated by the solid line. Therefore, in a case of p=−1, the measurement dead zone can be reduced, and the estimated optical power distribution that well matches a true optical power distribution measured by the OTDR is obtained, and it can be seen that the estimation accuracy is improved as compared with the case of p=0 corresponding to the DLM of the related art.

The optical transmission characteristic estimation unit 12 included in the optical reception device 1 according to the first embodiment models the optical effect of the optical transmission line 2 by a nonlinear Schrodinger equation, divides the optical transmission line 2 into N sections, obtains a solution of the nonlinear Schrodinger equation by an operation of N steps in which each of the section lengths of the divided N sections is a step size, and estimates the transmission characteristics of the optical transmission line. In the optical transmission characteristic estimation unit 12, the step size update unit 16 updates each of the N step sizes on the basis of the estimated optical power distribution and the estimated dispersion distribution, which are indicated by the transmission characteristics. Therefore, it is possible to obtain an estimation result with appropriate accuracy in the measurement dead zone even when the optical signal of low output optical power used in the normal operation is used in a case where characteristics of the optical transmission line is estimated by the DLM.

This is also based on the graph of FIG. 9 and the graph of FIG. 10. That is, the step size update unit 16 decreases the step size when the estimated optical power is large, and increases the step size when the estimated optical power is small. As described above, when the step size is increased, the width of the piecewise quadrature increases, and thus a value obtained by the piecewise quadrature increases. That is, the nonlinear phase rotation amount is increased by increasing the step size. That is, the nonlinear phase rotation amount is reduced by decreasing the step size. In other words, the step size update unit 16 adjusts the step size and thus the nonlinear phase rotation amount generated in the optical transmission line 2 is brought close to a constant value. Therefore, for example, in a case where noise is included in the reception signal and the optical power is small, the nonlinear phase rotation amount is likely to be buried in the noise. However, as described above, when the step size is changed and the nonlinear phase rotation amount is increased, the nonlinear phase rotation amount is made difficult to be buried in the noise, and the estimation accuracy can be improved.

Second Embodiment

Figure 11:
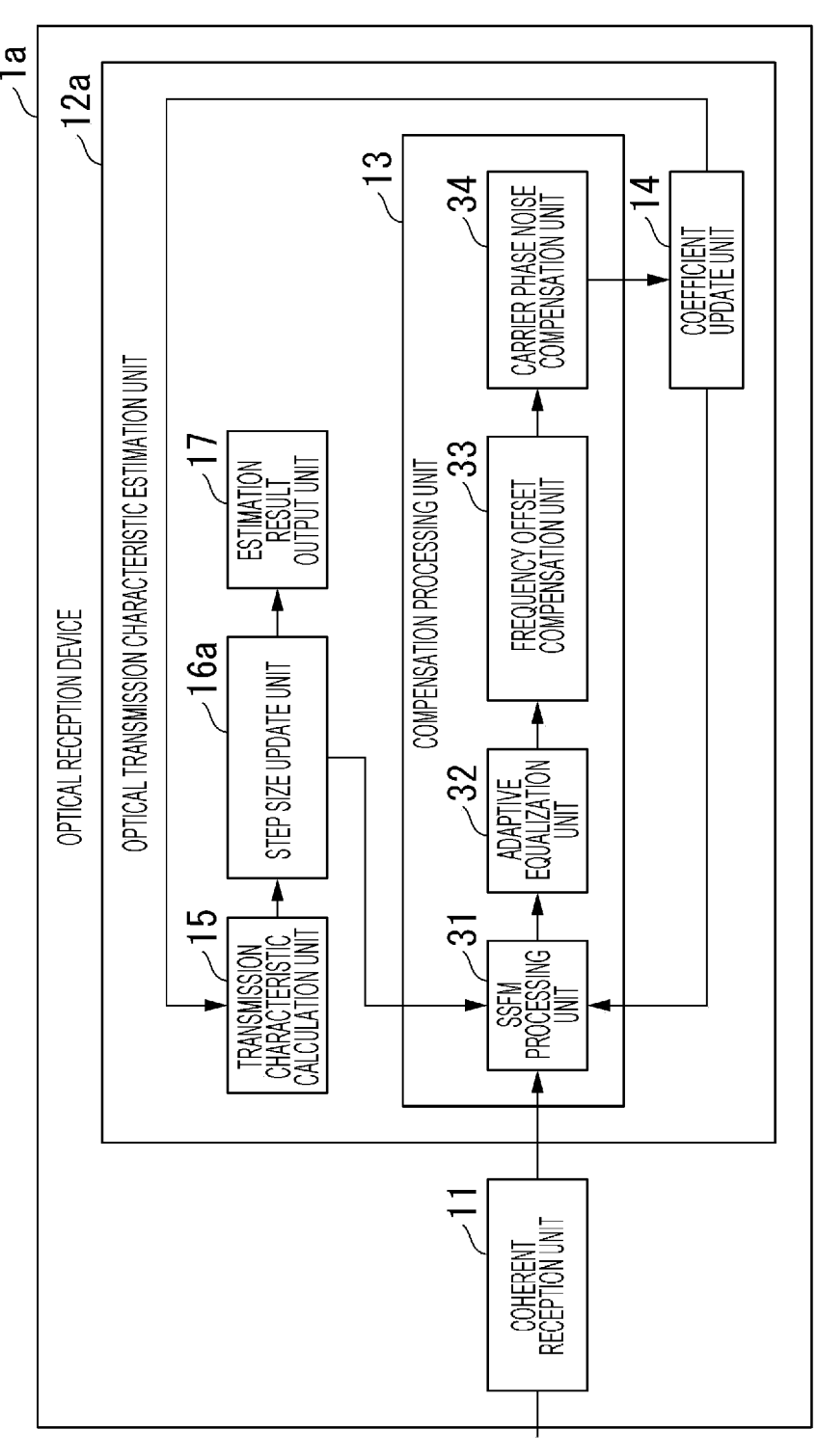
FIG. 11 is a block diagram illustrating a configuration of an optical reception device according to a second embodiment.
Figure 12:
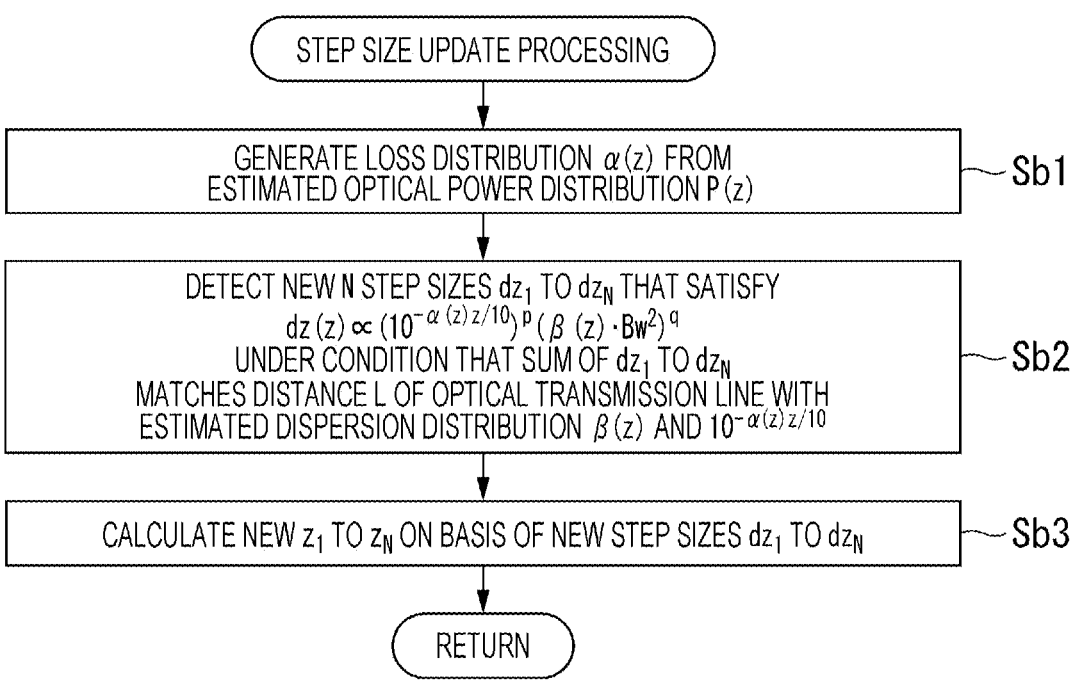
FIG. 12 is a flowchart illustrating a flow of processing of a step size update unit according to the second embodiment.
Figure 13:
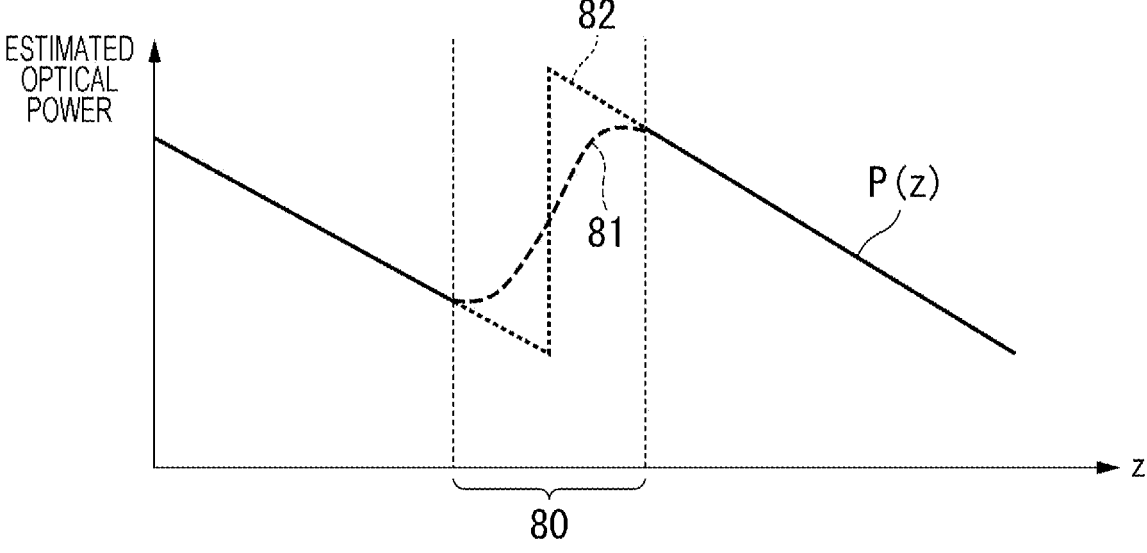
FIG. 13 is a diagram illustrating processing of a step size update unit according to the second embodiment.

FIG. 11 is a block diagram illustrating a configuration of an optical reception device 1a according to a second embodiment. The optical reception device $1a$ is a device used instead of the optical reception device $1$ included in the optical transmission system $100$ of the first embodiment, is connected to the optical transmission line $2$, and receives an optical signal transmitted by the optical transmission device $3$ via the optical transmission line $2$. In the optical reception device $1a$, the same components as those of the optical reception device $1$ of the first embodiment are denoted by the same reference numerals, and different components will be described below.

The optical reception device $1a$ includes a compensation processing unit $13$, a coefficient update unit $14$, a transmission characteristic calculation unit $15$, a step size update unit $16a$, and an estimation result output unit $17$. The optical reception device $1a$ is a device assumed to be used in a case where it is known that no abnormal loss occurs in the optical transmission line $2$. Here, the abnormal loss is a loss that rapidly decreases optical power at a certain position of the optical transmission line $2$ since the optical fiber of the optical transmission line $2$ is bent in the midway or is on the verge of being disconnected.

The step size update unit $16a$ has the same configuration as the step size update unit $16$ of the first embodiment except the following configuration. In a case where no abnormal loss occurs in the optical transmission line $2$, the optical power attenuates due to the loss caused by the optical fiber as the transmission distance becomes longer. Therefore, the step size update unit $16a$ calculates a change in the loss in the optical transmission line $2$, that is, calculates a function $a(z)$ indicating the loss distribution from the remaining distribution obtained by removing the measurement dead zone from the estimated optical power distribution indicated by the function $P(z)$ calculated by the transmission characteristic calculation unit $15$.

Under the condition that the sum of the new step sizes $dz_1$ to $dz_N$ becomes the distance "L" between the start point and the end point of the optical transmission line $2$, the step size update unit $16a$ detects a combination of the step sizes $dz_1$ to $dz_N$ by using Expression (7) below, to which the calculated function $a(z)$ is applied instead of Expression (4).

[Math. 7]

$$dz(z) \propto \left(10^{-a(z)z/10}\right)^p \left(\beta(z) \cdot Bw^2\right)^q \qquad (7)$$

(Processing by Optical Reception Device of Second Embodiment)

The processing by the optical reception device $1a$ of the second embodiment is processing in which the subroutine of the step size update processing of step S9 is replaced with the processing of the subroutine illustrated in FIG. $12$ in the flowchart of FIG. $6$ illustrating the processing flow of the optical reception device $1$ of the first embodiment. Therefore, in FIG. $6$, processing other than that in step S9 are performed as in the first embodiment.

Hereinafter, processing in step S9 of the second embodiment will be described with reference to a flowchart in FIG. $12$. The step size update unit $16a$ fetches the function $P(z)$ and the function $\beta(z)$, which indicate the transmission characteristics output from the transmission characteristic calculation unit $15$. The step size update unit $16a$ removes a portion of the measurement dead zone from the fetched function $P(z)$ by, for example, the following procedure.

The measurement dead zone is a portion where the value of the function $P(z)$ rapidly increases as shown in the graph of FIG. $16(b)$. The step size update unit $16a$ stores in advance a threshold for an increase rate determined in advance assuming an increase rate in the measurement dead zone in the internal storage area. The step size update unit $16a$ removes a portion where an increase exceeding the threshold for the increase rate has occurs from the function $P(z)$ on the basis of the threshold for the increase rate stored in the internal storage area.

For example, it is assumed that the function $P(z)$ indicates distribution as shown in the graph of FIG. $13$. Note that in the graph of FIG. $13$, the values indicated by the vertical axis and the horizontal axis are the same as those in the graph of FIG. $2(a)$. In this case, by the processing using the threshold for the increase rate, the step size update unit $16a$ removes a portion indicated by a broken line of reference numeral $81$ included in a portion $80$ of the measurement dead zone from the function $P(z)$. However, the function $P(z)$ becomes discontinuous only by removing the portion indicated by the broken line of reference numeral $81$ from the function $P(z)$. Therefore, the step size update unit $16a$ performs extension according to the slope of the remaining portion of the function $P(z)$ and performs interpolation as indicated by a dotted line of reference numeral $82$ so as to obtain a continuous change without interruption with respect to a distance $z$. After performing the interpolation, the step size update unit $16a$ calculates the function $a(z)$ indicating the loss distribution (step Sb1).

The step size update unit $16a$ reads "p", "q", the signal bandwidth "Bw" of the optical transmission line $2$, and the distance "L" between the start point and the end point of the optical transmission line $2$ from the internal storage area. The step size update unit $16a$ generates the calculated function $a(z)$, the fetched function $\beta(z)$, and a function represented by the expression on the right side of Expression (7) with the read "p", "q", and "Bw". Under the condition that the sum of the new step sizes $dz_1$ to $dz_N$ becomes the distance "L" between the start point and the end point of the optical transmission line $2$, the step size update unit $16a$ detects a combination of the new step sizes $dz_1$ to $dz_N$ that satisfies Expression (7) while increasing or decreasing the entire step sizes $dz_1$ to $dz_N$ by, for example, binary search (step Sb2).

Thereafter, the same processing as the processing of step Sa2 of FIG. $7$ is performed by the step size update unit $16a$ (step Sb3).

The function $a(z)$ indicating the loss distribution obtained by removing the measurement dead zone from the function $P(z)$ and performing the interpolation as described above indicates a change approximate to the true loss distribution. In Expression (7), a portion of "$10^{-a(z)z/10}$" is a function indicating a rate of a change in optical power indicated using the function $a(z)$ indicating the loss distribution. As the function $a(z)$ correctly approximates the true loss distribution, a portion of "$10^{-a(z)z/10}$" approximates the rate of a change in the true optical power. Therefore, the step size update unit $16a$ of the second embodiment can detect more appropriate step sizes $dz_1$ to $dz_N$ more quickly than the step size update unit $16$ of the first embodiment.

In the second embodiment, the step size update unit $16a$ calculates the function $a(z)$ indicating the loss distribution by removing the measurement dead zone from the function $P(z)$ and performing interpolation. On the other hand, the function $a(z)$ is disclosed in advance as a specification for each type of optical fiber. For example, Non Patent Literature 2 discloses examples of 0.199 dB/km, 0.230 dB/km, and 0.225 dB/km as functions $a(z)$ in the cases of a standard single mode fiber (SSMF), a dispersion shifted fiber (DSF), and a non-zero dispersion shifted fiber (NZ-DSF). As described above, when a typical value of the function a(z) of each of a plurality of the optical fibers provided in the optical transmission line 2 is known, the typical values of the function a(z) of a plurality of the optical fibers may be connected so as not to cause interruption in the distance z, a function a(z) indicating the entire loss distribution of the optical transmission line 2 may be generated in advance, and the generated function a(z) may be applied to the step size update unit 16*a*.

In the first and second embodiments, since P(z) in Expression (4) and a(z) in Expression (7) are unknown in the first processing, the function P(z) is acquired as a rough profile of the estimated optical power distribution of the optical transmission line 2 in the processing of step S8 in the first time by using the step sizes $dz_1$ to $dz_N$ having the same length as the initial values. On the other hand, it is assumed that the function a(z) indicating the entire loss distribution of the optical transmission line 2, which is generated by connecting the function a(z) disclosed in advance as a specification for each type of optical fiber as described above, is used. In this case, as the initial values of the step sizes $dz_1$ to $dz_N$, the step sizes $dz_1$ to $dz_N$ having different lengths detected in advance according to the entire loss distribution of the optical transmission line 2 can be applied, and thus the time required for estimating the transmission characteristics can be shortened.

(Another Configuration Example (Part 1) of Optical Reception Device)

In the optical reception device 1 illustrated in FIG. 1, the order of arrangement of the SSFM processing unit 31, the adaptive equalization unit 32, the frequency offset compensation unit 33, and the carrier phase noise compensation unit 34 in the compensation processing unit 13 may be changed as below. For example, the adaptive equalization unit 32 may be connected to the output side of the coherent reception unit 11, the frequency offset compensation unit 33 may be connected to the output side of the adaptive equalization unit 32, the carrier phase noise compensation unit 34 may be connected to the output side of the frequency offset compensation unit 33, and the SSFM processing unit 31 may be connected to the output side of the carrier phase noise compensation unit 34. That is, the position of the SSFM processing unit 31 is arbitrary, and in a state in which the coherent reception unit 11, the adaptive equalization unit 32, the frequency offset compensation unit 33, and the carrier phase noise compensation unit 34 are connected in this order, the SSFM processing unit 31 may be inserted between the adaptive equalization unit 32 and the frequency offset compensation unit 33, or the SSFM processing unit 31 may be inserted between the frequency offset compensation unit 33 and the carrier phase noise compensation unit 34. However, in a case where the order of connection is switched as described above, the coefficient update unit 14 fetches a signal output from the last functional unit of the compensation processing unit 13 in which the functional units have been rearranged. In a case where the arrangement of the functional units is switched in this manner, the order of the processing illustrated in steps S3 and S4 in the flowchart of FIG. 6 is switched according to the order of the processing.

(Still Another Configuration Example (Part 2) of Optical Reception Device)

Figure 14:
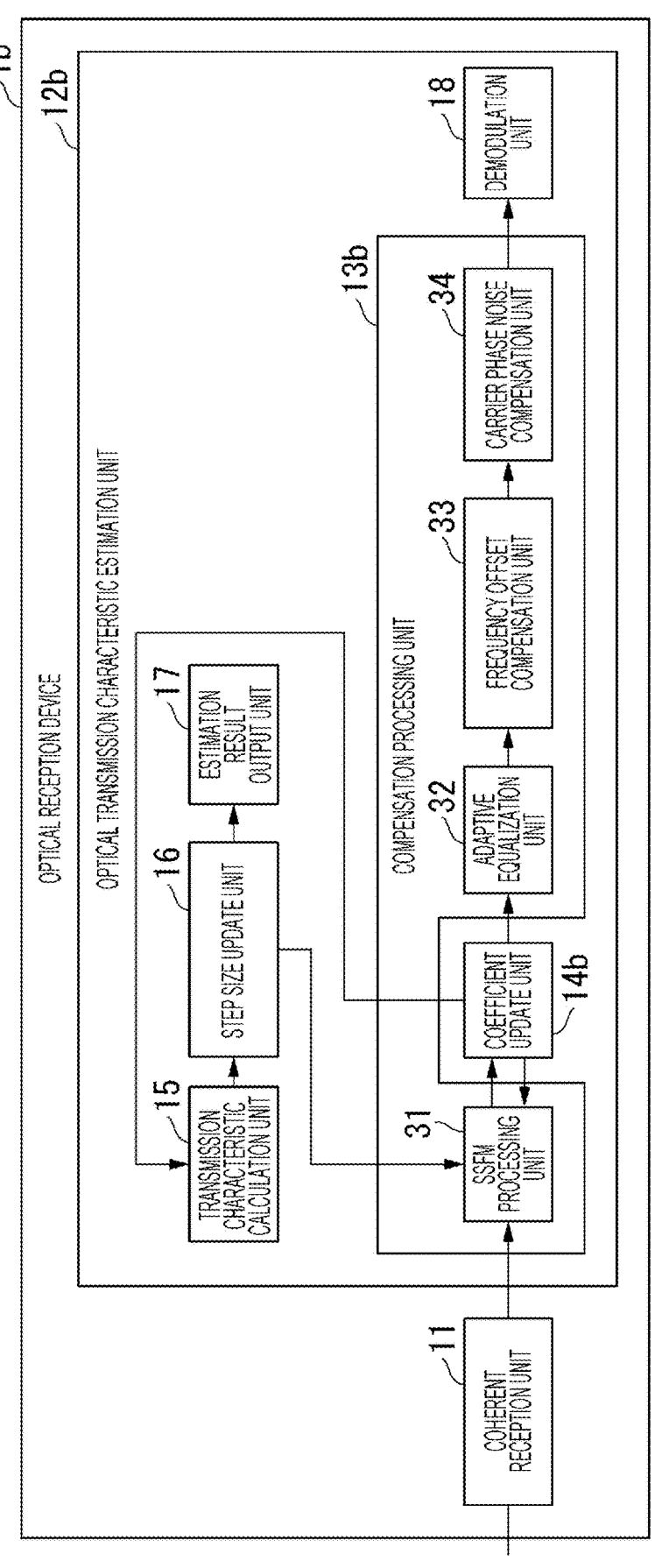
FIG. 14 is a block diagram illustrating another configuration example (part 2) of an optical reception device.

An optical reception device 1*b* illustrated in FIG. 14 may be used instead of the optical reception device 1 illustrated in FIG. 1. Note that in the optical reception device 1*b*, the same components as those of the optical reception device 1 are denoted by the same reference numerals, and different components will be described below. The optical reception device 1*b* includes a compensation processing unit 13*b* instead of the compensation processing unit 13, a coefficient update unit 14*b* instead of the coefficient update unit 14, and further a demodulation unit 18. Similarly to the compensation processing unit 13, the compensation processing unit 13*b* includes the SSFM processing unit 31, the adaptive equalization unit 32, the frequency offset compensation unit 33, and the carrier phase noise compensation unit 34, but the adaptive equalization unit 32 is not connected to the SSFM processing unit 31, the coefficient update unit 14*b* is connected to the output side of the SSFM processing unit 31, and the adaptive equalization unit 32 is connected to the output side of the coefficient update unit 14*b*.

In the case of the optical reception device 1*b*, the training signal cannot be compared with the signal output from the SSFM processing unit 31. Therefore, as a compensation signal, it is necessary to generate in advance a signal obtained by giving a characteristic inverse to the characteristic of a compensation made by the adaptive equalization unit 32, the frequency offset compensation unit 33, and the carrier phase noise compensation unit 34 to the training signal, and store the comparison signal generated in advance in the storage area inside the coefficient update unit 14*b*. In a case where the signal output from the SSFM processing unit 31 is fetched, the coefficient update unit 14*b* calculates the new dispersion coefficients $\beta_1$ to $\beta_N$ and the new nonlinear phase rotation amounts $\varphi_1$ to $\varphi_N$ by an optimization algorithm that minimizes the value of the evaluation function on the basis of the fetched signal and the comparison signal stored in the internal storage area.

In a case where the signal output from the SSFM processing unit 31 is fetched, the coefficient update unit 14*b* outputs the fetched signal as it is to the adaptive equalization unit 32. Therefore, it is sufficient that the processing of step S5 is performed after the processing of step S3 illustrated in FIG. 6, and the processing of step S4 is not essential processing from the viewpoint of the DLM processing.

The demodulation unit 18 demodulates the transmission signal from the transmission symbol included in the signal subjected to the phase offset compensation, which is output from the carrier phase noise compensation unit 34. Note that the demodulation unit 18 is a functional unit that demodulates the transmission signal from the transmission symbol restored from the reception signal, and thus may be included in the optical reception device 1 of the first embodiment. In this case, the demodulation unit 18 is connected to the output side of the carrier phase noise compensation unit 34.

(Still Another Configuration Example (Part 3) of Optical Reception Device)

Figure 15:
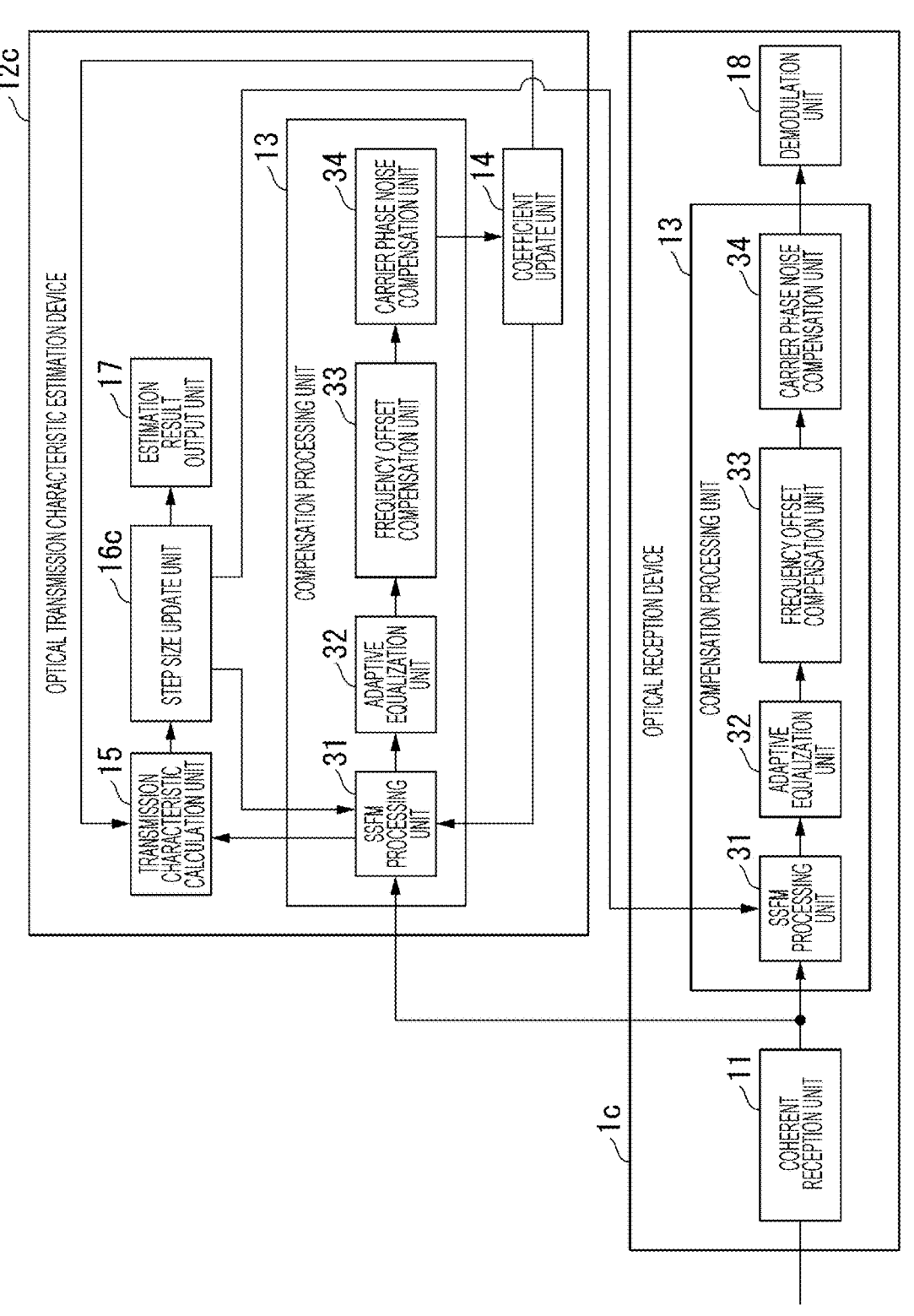
FIG. 15 is a block diagram illustrating still another configuration example (part 3) of an optical reception device.

An optical reception device 1*c* illustrated in FIG. 15 is used instead of the optical reception device 1 of FIG. 1 and the optical transmission characteristic estimation device 12*c* may be connected to the optical reception device 1*c*. The optical transmission characteristic estimation device 12*c* is, for example, a device provided as a functional unit of a network control device, and is connected to the optical reception device 1*c* via a communication network. Note that in the optical reception device 1*c* and the optical transmission characteristic estimation device 12*c*, the same components as those of the optical reception device 1 and the optical reception device 1*b* are denoted by the same reference numerals, and different components will be described below.

The optical reception device 1*c* includes a coherent reception unit 11 connected to the optical transmission line 2, a compensation processing unit 13, and a demodulation unit

18. The optical transmission characteristic estimation device 12c includes a compensation processing unit 13, a coefficient update unit 14, a transmission characteristic calculation unit 15, a step size update unit 16c, and an estimation result output unit 17. The SSFM processing unit 31 of the compensation processing unit 13 of the optical transmission characteristic estimation device 12c is connected to the output side of the coherent reception unit 11 of the optical reception device 1c and fetches the reception signal output from the coherent reception unit 11. The step size update unit 16c has the same configuration as the step size update unit 16 of the first embodiment, and moreover, outputs the step sizes $dz_1$ to $dz_N$, the dispersion coefficients $\beta_1$ to $\beta_N$, and the nonlinear phase rotation amounts $\varphi_1$ to $\varphi_N$, which are calculated in the immediately preceding step S9, to the control unit 60 of the SSFM processing unit 31 of the optical reception device 1c in the processing of step S12. Therefore, the SSFM processing unit 31 of the optical reception device 1c can perform compensation for the wavelength dispersion and compensation for the nonlinear phase rotation on the basis of the step sizes $dz_1$ to $dz_N$ determined to be optimal by the optical transmission characteristic estimation device 12c and the dispersion coefficients $\beta_1$ to $\beta_N$ and the nonlinear phase rotation amounts $\varphi_1$ to $\varphi_N$, which are calculated according to the step sizes $dz_1$ to $dz_N$. Note that other configuration examples similar to the other configuration examples (part 1), (part 2), and (part 3) corresponding to the optical reception device 1 of the first embodiment may be configured on the basis of the optical reception device 1a of the second embodiment.

In the first and second embodiments and other configuration examples described above, the step size update units 16, 16a, and 16c perform determination by using Expression (5) when determining convergence of the step sizes $dz_1$ to $dz_N$ in step S10. On the other hand, Expression (8) using the dispersion coefficient as a determination index may be applied to the determination processing in step S10 instead of Expression (5). However, in this case, an area for storing previous $\beta_{k-1}(z_1)$ to $\beta_{k-1}(z_N)$ is provided in the storage areas inside the step size update units 16, 16a, and 16c, and $\beta_0(z_1)$ to $\beta_0(z_N)$ need to be written in advance as initial values in the area. Note that a subscript of the letter $\beta$ indicates the number of repetitions of the processing of the step size update units 16, 16a, and 16c. The step size update units 16, 16a, and 16c may determine that the step sizes $dz_1$ to $dz_N$ have converged in a case where both of Expression (5) and Expression (8) are satisfied, or may determine that the step sizes $dz_1$ to $dz_N$ have converged in a case where any one of Expression (5) and Expression (8) is satisfied.

[Math. 8]

$$\max(|\beta_k(z_n) - \beta_{k-1}(z_n)| < \varepsilon \tag{8}$$

Instead of Expression (5), the step size update units 16, 16a, and 16c may apply Expression (9) using mean square error of the estimated optical power as a determination index to the determination processing in step S10.

[Math. 9]

$$\frac{1}{N}\sum_{n=1}^{N}(P_k(z_n) - P_{k-1}(z_n))^2 < \varepsilon \tag{9}$$

The step size update units 16, 16a, and 16c may apply Expression (10) or Expression (11) below to the determination processing of step S10 instead of Expression (5).

[Math. 10]

$$\max(|P_k(z_m) - P_{true}(z_m)|) < \varepsilon \tag{10}$$

[Math. 11]

$$\sum_{m=1}^{M}(P_k(z_m) - P_{true}(z_m))^2 < \varepsilon \tag{11}$$

In Expressions (10) and (11), $z_m$ is a position on the optical transmission line 2 where the true optical power can be measured, and is, for example, a position of a start point or a position of an end point of each of a plurality of the optical fibers included in the optical transmission line 2. In such a position, true input optical power, true output optical power, and the like can be measured by using other monitoring means such as the OTDR. In Expressions (10) and (11), $P_{true}(z_m)$ represents the true optical power obtained by measurement. Note that, in Expressions (10) and (11), m is an integer of one to M, and M is an integer of one or more. However, as the value of M is larger, that is, as the number of positions where the true optical power can be measured is great, the measurement accuracy in step S10 can be made higher.

In the first and second embodiments and other configuration examples described above, a length of one section when the optical transmission line 2 is equally divided into N sections is used as each of the initial values of the step sizes $dz_1$ to $dz_N$ stored in the storage area inside the control unit 60 of the SSFM processing unit 31. On the other hand, as the initial values of the step sizes $dz_1$ to $dz_N$, randomly selected lengths may be applied under the condition that the sum of the step sizes $dz_1$ to $dz_N$ is the distance "L" between the start point and the end point of the optical transmission line 2.

In the first and second embodiments and other configuration examples described above, the step size update units 16, 16a, and 16c detect new step sizes $dz_1$ to $dz_N$ by the binary search, but may detect the new step sizes $dz_1$ to $dz_N$ by a search method other than the binary search.

For example, it is assumed that the magnitude of the optical power of the optical signal transmitted by the optical transmission device 3 is known, the type of optical fiber included in the optical transmission line 2 is known, and the function a(z) indicating the loss distribution for each type of optical fiber and the nonlinear constant are disclosed as a specification. In this case, the nonlinear phase rotation amounts $\varphi_1$ to $\varphi_N$ that can be calculated from the nonlinear constants $\gamma_1$ to $\gamma_N$ that can be specified from the known magnitude of the optical power, the disclosed function a(z), and the disclosed the nonlinear constant may be applied as the initial values of the nonlinear phase rotation amounts $\varphi_1$ to $\varphi_N$ stored in the storage area inside the control unit 60 of the SSFM processing unit 31 of the optical reception devices 1 and 1a, the optical reception devices 1b of another configuration example, and the optical transmission characteristic estimation device 12c according to the first and second embodiments. Similarly, in a case where the type of optical fiber included in the optical transmission line 2 is known and the dispersion coefficient for each type of optical fiber is disclosed as a specification, the dispersion coefficients $\beta_1$ to $\beta_N$ that can be specified from the disclosed dispersion coefficients may be applied as initial values of the dispersion coefficients $\beta_1$ to $\beta_N$ stored in the storage area inside the control unit 60.

In the first and second embodiments and other configuration examples described above, the nonlinear constants $\gamma_1$ to $\gamma_N$ are determined in advance. However, as described above, in a case where the type of optical fiber is unknown and the nonlinear constants $\gamma_1$ to $\gamma_N$ cannot be determined in advance, the transmission characteristic calculation unit 15 cannot calculate the estimated optical power P(z). In this case, instead of the estimated optical power P(z), the transmission characteristic calculation unit 15 interpolates the nonlinear phase rotation amounts $\varphi_1$ to $\varphi_N$ proportional to the estimated optical power P(z) to calculate a function $\varphi(z)$ indicating a change in the nonlinear phase rotation amount, and outputs the calculated $\varphi(z)$ to the step size update units 16 and 16a. The step size update units 16 and 16a perform processing by using the function $\varphi(z)$ output from the transmission characteristic calculation unit 15 instead of the function P(z).

In the first and second embodiments and other configuration examples described above, the Fourier transform units 41-1 to 41-N of the SSFM processing unit 31 execute FFT. However, Fourier transform other than the FFT, for example, discrete Fourier transform (DFT) may be executed. Similarly, the inverse Fourier transform units 43-1 to 43-N of the SSFM processing unit 31 execute IFFT. However, inverse Fourier transform other than the IFFT, for example, inverse discrete Fourier transform (IDFT) may be executed.

In the first and second embodiments and other configuration examples described above, the optical transmission device 3 transmits a polarization-multiplexed QPSK optical signal, but may transmit an optical signal optically modulated by another modulation scheme. In this case, the coherent reception unit 11 performs detection by a demodulation scheme corresponding to another modulation scheme applied to the optical transmission device 3.

In the first and second embodiments and other configuration examples described above, the SSFM processing unit 31 executes SSFM, but may obtain a solution of the nonlinear Schrodinger equation by a numerical analysis method other than the SSFM. For example, an approximate model by a perturbation method of the nonlinear Schrodinger equation may be used.

In the first and second embodiments and other configuration examples described above, the SSFM processing unit 31 estimates the transmission characteristics by adopting a configuration in which the SSFM is applied to the reception signal, backpropagation is performed, and the transmission signal is restored. On the other hand, a configuration may be adopted in which the SSFM is applied to the transmission signal, forward propagation is performed, and the reception signal is restored.

In the configurations of the first and second embodiments, the determination processing using an inequality sign is performed in the determination processing in step S6 and step S10 of the first embodiment and the processing of step Sb1 of the subroutine of step S9 of the second embodiment. However, the present invention is not limited to the embodiments, and the processing of determining "whether or not to exceed" and the processing of determining "whether or not to be less than" are merely examples, and may be replaced with processing of determining "whether or not to be equal to or more than" and processing of determining "whether or not to be equal to or less than", respectively, depending on the way of determining a threshold. The threshold used in the determination processing is also an example, and different thresholds may be applied to respective determinations.

The optical transmission characteristic estimation units 12, 12a, and 12b and the optical transmission characteristic estimation device 12c, which are included in the optical reception devices 1, 1a, and 1b according to the first and second embodiments and other configuration examples described above may be implemented by a computer. In such a case, a program for implementing the functions may be recorded in a computer-readable recording medium, and the functions may be implemented by loading the program recorded on this recording medium to a computer system, and executing the program. Note that the "computer system" herein includes hardware such as an operating system (OS) and peripheral devices. Furthermore, the "computer-readable recording medium" refers to a portable medium such as a flexible disk, a magneto-optical disk, a read only memory (ROM), or a CD-ROM, or a storage device such as a hard disk included in the computer system. Furthermore, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Furthermore, the program described above may be for implementing some of the functions described above, may be implemented in a combination of the functions described above and a program already recorded in the computer system, or may be implemented with a programmable logic device such as a field programmable gate array (FPGA).

Although the embodiment of the present invention has been described in detail with reference to the drawings, the specific configuration is not limited to the embodiment, and includes design and the like within a range not departing from the gist of the present invention.

INDUSTRIAL APPLICABILITY

The present invention can be applied to compensation processing in the digital coherent optical transmission system.

REFERENCE SIGNS LIST

1 Optical reception device
2 Optical transmission line
3 Optical transmission device
11 Coherent reception unit
12 Optical transmission characteristic estimation unit
13 Compensation processing unit
14 Coefficient update unit
15 Transmission characteristic calculation unit
16 Step size update unit
17 Estimation result output unit
31 SSFM processing unit
32 Adaptive equalization unit
33 Frequency offset compensation unit
34 Carrier phase noise compensation unit
100 Optical transmission system

The invention claimed is:

1. An optical transmission characteristic estimation device that models an optical effect of an optical transmission line by a nonlinear Schrodinger equation, divides the optical transmission line into N (N is an integer of two or more) sections, obtains a solution of the nonlinear Schrodinger equation by an operation of N steps in which a section length of each of the divided N sections is a step size, and estimates transmission characteristics of the optical transmission line, the optical transmission characteristic estimation device comprising:

a step size updater configured to update each of the N step sizes on the basis of an estimated optical power distribution and an estimated dispersion distribution, which are indicated by the transmission characteristics.

2. The optical transmission characteristic estimation device according to claim 1, wherein the step size updater detects the new N step sizes such that a rate of a change in the step size obtained by sequentially arranging and linearly interpolating the N step sizes is proportional to a rate of a change indicated by a third distribution obtained by multiplying a first distribution obtained by exponentiating the estimated optical power distribution with a predetermined power exponent p and a second distribution obtained by multiplying the estimated dispersion distribution by a square value of a signal bandwidth of the optical transmission line and then exponentiating the multiplied value with a predetermined power exponent q.

3. The optical transmission characteristic estimation device according to claim 2, wherein the step size updater detects the new N step sizes with a power exponent $p=-1$ in a case where a dispersion coefficient indicated by the estimated dispersion distribution of the optical transmission line is a same value at any position of the optical transmission line.

4. The optical transmission characteristic estimation device according to claim 1, further comprising a split-step Fourier method processor configured to apply a split-step Fourier method, which is a solution of the nonlinear Schrodinger equation, as a method of operating the N steps, to a reception signal subjected to coherent detection, wherein the split-step Fourier method processor applies the split-step Fourier method to the reception signal by setting each of initial values of the N step sizes as a length of one section when a length of the optical transmission line is equally divided into N sections.

5. The optical transmission characteristic estimation device according to claim 1, wherein the step size updater updates each of the N step sizes by using a loss distribution of the optical transmission line instead of the estimated optical power distribution indicated by the transmission characteristics.

6. The optical transmission characteristic estimation device according to claim 5, wherein the step size updater uses, as the loss distribution of the optical transmission line, a loss distribution calculated in advance from a remaining distribution obtained by removing a portion of a measurement dead zone from the estimated optical power distribution, or a loss distribution determined in advance for each type of optical fiber included in the optical transmission line.

7. An optical transmission characteristic estimation method for modeling an optical effect of an optical transmission line by a nonlinear Schrodinger equation, dividing the optical transmission line into N (N is an integer of two or more) sections, obtaining a solution of the nonlinear Schrodinger equation by an operation of N steps in which a section length of each of the divided N sections is a step size, and estimating transmission characteristics of the optical transmission line, the optical transmission characteristic estimation method comprising:

updating each of the N step sizes on the basis of an estimated optical power distribution and an estimated dispersion distribution, which are indicated by the transmission characteristics.

8. A non-transitory storage medium that stores a program for making a computer perform processes, the processes comprising:

modeling an optical effect of an optical transmission line by a nonlinear Schrodinger equation, and dividing the optical transmission line into N (N is an integer of two or more) sections;

obtaining a solution of the nonlinear Schrodinger equation by an operation of N steps in which a section length of each of the divided N sections is a step size, and estimating transmission characteristics of the optical transmission line; and updating each of the N step sizes on the basis of an estimated optical power distribution and an estimated dispersion distribution, which are indicated by the transmission characteristics.

\* \* \* \* \*